United States Patent
Kim et al.

(10) Patent No.: US 11,481,065 B2
(45) Date of Patent: Oct. 25, 2022

(54) TOUCH APPARATUS AND DRIVING METHOD THEREOF

(71) Applicant: HiDeep Inc., Seongnam-si (KR)

(72) Inventors: Seyeob Kim, Seongnam-si (KR);
Bonkee Kim, Seongnam-si (KR);
Youngho Cho, Seongnam-si (KR); Sein Lee, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 179 days.

(21) Appl. No.: 16/893,543

(22) Filed: Jun. 5, 2020

(65) Prior Publication Data

US 2020/0393949 A1 Dec. 17, 2020

(30) Foreign Application Priority Data

Jun. 11, 2019 (KR) ........................ 10-2019-0068951

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01); *G06F 3/04186* (2019.05); *G06F 2203/04106* (2013.01)

(58) Field of Classification Search
CPC ............. G06F 3/04166; G06F 3/04184; G06F 3/04186; G06F 3/044; G06F 2203/04106
See application file for complete search history.

(56) References Cited

U.S. PATENT DOCUMENTS

| 7,576,731 B2 | 8/2009 | Okazaki |
| 2012/0056834 A1* | 3/2012 | Kim ...................... G06F 3/0446 345/173 |

FOREIGN PATENT DOCUMENTS

| JP | 5909296 | 4/2016 |
| KR | 10-2015-0015273 | 2/2015 |

(Continued)

OTHER PUBLICATIONS

Machine Translation of KR 10-1625104. (Year: 2022).*

(Continued)

*Primary Examiner* — Michael Pervan
(74) *Attorney, Agent, or Firm* — Lex IP Meister, PLLC

(57) ABSTRACT

A touch apparatus according to an exemplary embodiment includes: a touch panel that is disposed on a display panel of a display device that drives a plurality of pixels according to a vertical synchronization signal and a horizontal synchronization signal, and includes a plurality of first touch electrodes for sensing a touch input in a first direction and a plurality of second touch electrode for sensing a touch input in a second direction; a driver/receiver that applies a driving signal to at least one of the plurality of first touch electrodes and the plurality of second touch electrodes during a first section, and receives a detection signal from at least one of the plurality of first touch electrodes and the plurality of second touch electrodes during a second section after the first section; and a controller that generates touch information by using the detection signal, wherein the driving signal is synchronized with at least one synchronization signal of the horizontal synchronization signal and the vertical synchronization signal.

20 Claims, 18 Drawing Sheets

(56) References Cited

FOREIGN PATENT DOCUMENTS

KR  10-1625104  5/2016
KR  10-1909985  10/2018

OTHER PUBLICATIONS

Machine Translation of KR 10-1909985. (Year: 2022).*
KIPO, International Search Report of corresponding Application No. PCT/KR2020/007245, dated Sep. 15, 2020.
KIPO, Written Opinion of the International Searching Authority of corresponding Application No. PCT/KR2020/007245, dated Sep. 15, 2020.

* cited by examiner

TOUCH APPARATUS AND DRIVING METHOD THEREOF

CROSS-REFERENCE TO RELATED APPLICATION

This application claims priority to and the benefit of Korean Patent Application No. 10-2019-0068951 filed in the Korean Intellectual Property Office on Jun. 11, 2019, the entire contents of which are incorporated herein by reference.

BACKGROUND OF THE INVENTION

(a) Field of the Invention

The present disclosure relates to a touch apparatus and a driving method thereof.

(b) Description of the Related Art

Various terminals such as mobile phones, smart phones, tablet PCs, laptop computers, terminals for digital broadcasting, personal digital assistants (PDAs), portable multimedia players (PMPs), and navigation devices are provided with a touch sensor.

Within these terminals, the touch sensor can be positioned on a display panel that displays an image, or it can be positioned on an area of the terminal body. Since a user interacts with the terminal by touching the touch sensor, the terminal can provide an intuitive user interface to the user.

The user can use a stylus pen for a sophisticated touch input. The stylus pen can transmit/receive signals through a touch sensor and an electrical and/or magnetic method.

Conventionally, in order to receive a detection signal from touch electrodes included in a touch sensor, amplifiers corresponding to each of the touch electrodes are provided in the touch sensor.

The above information disclosed in this Background section is only for enhancement of understanding of the background of the invention, and therefore it may contain information that does not form the prior art that is already known in this country to a person of ordinary skill in the art.

SUMMARY OF THE INVENTION

Exemplary embodiments provide a touch apparatus that prevents noise by a display panel, and a driving method thereof.

In order to achieve the above-stated or another purpose, a touch apparatus according to an exemplary embodiment includes: a touch sensor that is disposed in a display area of a display device that drives a plurality of pixels according to a vertical synchronization signal and a horizontal synchronization signal, and includes a plurality of first touch electrodes for sensing a touch input in a first direction and a plurality of second touch electrode for sensing a touch input in a second direction; a driver/receiver that applies a driving signal to at least one of the plurality of first touch electrodes and the plurality of second touch electrodes during a first section, and receives a detection signal from at least one of the plurality of first touch electrodes and the plurality of second touch electrodes during a second section after the first section; and a controller that generates touch information by using the detection signal, wherein the driving signal is synchronized with at least one synchronization signal of the horizontal synchronization signal and the vertical synchronization signal.

The driver/receiver may simultaneously apply the driving signal to at least one of the plurality of first touch electrodes and at least one of the plurality of second touch electrodes during the first section, and may receive a detection signal from at least one of the plurality of first touch electrodes and at least one of the plurality of second touch electrodes during the second section.

The driving signal may be synchronized with pulses of the horizontal synchronization signal of a predetermined cycle.

The driving signal may be synchronized with a pulse of the vertical synchronization signal for each frame of a predetermined cycle.

A frequency of the driving signal may be two or more integer times a frequency of the horizontal synchronization signal.

The detection signal may be received at a section determined corresponding to the horizontal synchronization signal.

The section determined corresponding to the horizontal synchronization signal may be a section other than a period during which a data signal is written into at least some of the plurality of pixels.

The section determined corresponding to the horizontal synchronization signal may be a period during which a scan signal applied to the plurality of pixels is a disable level.

The section determined corresponding to the horizontal synchronization signal may be a period during which a data signal is applied to at least one of a plurality of data lines connected to the plurality of pixels.

The driver/receiver may receive the detection signal according to a frequency of a driving signal synchronized with a frequency of the horizontal synchronization signal.

A receiving time of the detection signal may at least include two times of which phases are opposite to each other within on cycle of the frequency.

A receiving time of the detection signal may at least include two times of which phases are changed within one cycle of the frequency.

The detection signal may be a signal of which a resonance signal of the driving signal is transmitted to at least one of the plurality of first touch electrodes and the plurality of second touch electrodes.

The display portion may be disposed on a substrate, a thin film encapsulation layer may be disposed on the display portion, the plurality of touch electrodes may be disposed on the thin film encapsulation layer, and the thin film encapsulation may have a thickness of 4 μm to 10 μm.

A driving method of a touch apparatus according to an exemplary embodiment includes: receiving a horizontal synchronization signal from a signal controller of a display device; applying a driving signal to at least one of a plurality of first touch electrodes for sensing a touch input in a first direction and a plurality of second touch electrodes for sensing a touch input in a second direction that crosses the first direction of a touch sensor during a first section; receiving a detection signal from at least one of the plurality of first touch electrodes and the plurality of second touch electrodes during a second section after the first section; and generating touch information by using the detection signal, wherein the driving signal is synchronized with at least one synchronization signal of the horizontal synchronization signal and the vertical synchronization signal.

the applying of the driving signal may include simultaneously applying the driving signal to at least one of the plurality of first touch electrodes and at least one of the plurality of second electrodes during the first section, and the receiving of the detection signal may include receiving a detection signal from at least one of the plurality of first touch electrodes and at least one of the plurality of second electrodes during the second section.

The driving signal may be synchronized with pulses of the horizontal synchronization signal.

A frequency of the driving signal may be two or more integer times a frequency of the horizontal synchronization signal.

The detection signal may be received in a section determined to correspond to the horizontal synchronization signal.

The section determined to correspond to the horizontal synchronization signal may be a section other than a period during which a data signal is written into at least a part of the plurality of pixels.

The section determined to correspond to the horizontal synchronization signal may be a period during which a scan signal applied to the plurality of pixels has a disable level.

The section determined to correspond to the horizontal synchronization signal may be a section other than a period during which a data signal is applied to at least one of a plurality of data lines connected to the plurality of pixels.

The receiving of the detection signal may include receiving the detection signal in a section other than a period during which a data signal is written into at least a part of a plurality of pixels of the display device according to the horizontal synchronization signal.

The receiving of the detection signal may include receiving the detection signal for a period during which a scan signal applied to a plurality of pixels of the display device is a disable level according to the horizontal synchronization signal.

The receiving the detection signal may include receiving the detection signal for a period excluding a period during which a data signal is applied to at least one of a plurality of data lines connected to a plurality of pixels.

A display device according to an exemplary embodiment includes: a display panel including a display area where a plurality of pixels are located; a data driver that applies a data signal to data lines connected to the plurality of pixels; a scan driver that applies a scan signal to scan lines connected to the plurality of pixels; a signal controller that controls the data driver and the scan driver according to a horizontal synchronization signal; a touch sensor including an active area that overlaps the display area and where a plurality of first touch electrodes for sensing a touch input in a first direction and a plurality of second touch electrodes for sensing a touch input in a second direction that crosses the first direction are located; and a touch controller that drives the touch sensor to apply the driving signal to at least one of the plurality of first touch electrodes and at least one of the plurality of second touch electrodes during a first section, and receives a detection signal from at least one of the plurality of first touch electrodes and the plurality of second touch electrodes during a second section after the first section, wherein the driving signal is synchronized with pulses of at least one synchronization signal of the horizontal synchronization signal and the vertical synchronization signal.

A frequency of the driving signal may be two or more integer times a frequency of the horizontal synchronization signal.

A touch system according to an exemplary embodiment includes: a touch apparatus that includes a touch sensor that is disposed on a display panel of a display device that drives a plurality of pixels according to a vertical synchronization signal and a horizontal synchronization signal, and includes a plurality of first touch electrodes for sensing a touch input in a first direction and a plurality of second touch electrode for sensing a touch input in a second direction; a driver/receiver that applies a driving signal to at least one of the plurality of first touch electrodes and the plurality of second touch electrodes during a first section, and receives a detection signal from at least one of the plurality of first touch electrodes and the plurality of second touch electrodes during a second section after the first section; and a controller that generates touch information by using the detection signal; and a stylus pen that includes a conductive tip and a resonance circuit portion that is connected to the conductive tip and is resonated with a driving signal transmitted from the conductive tip, wherein the detection signal is a signal resonated by the resonance circuit portion, and the driving signal is a signal synchronized with at least one synchronization signal of the horizontal synchronization signal and the vertical synchronization signal.

According to the exemplary embodiments, there is a merit that can improve a signal to noise ratio (SNR) of the touch apparatus.

According to the exemplary embodiment, there is a merit that can improve reception sensitivity of a touch input.

According to the exemplary embodiments, there is a merit capable of calculating a more accurate touch position.

DETAILED DESCRIPTION OF THE EMBODIMENTS

Figure 1:
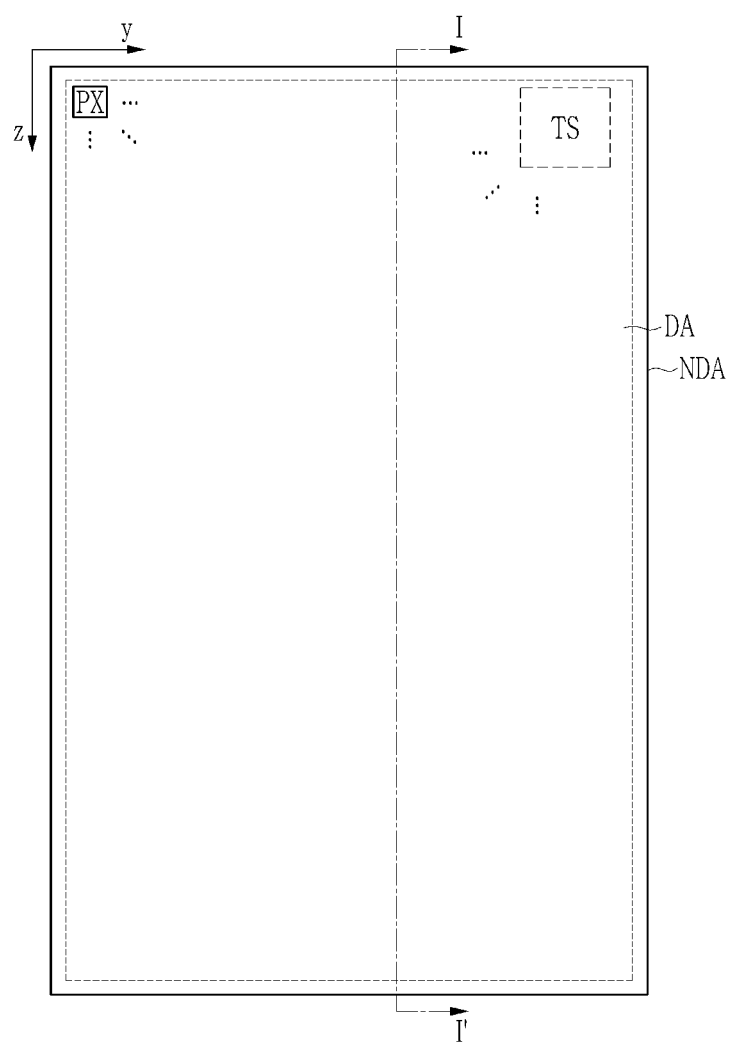
FIG. 1 is a schematic top plan view of a part of a display device including a touch apparatus according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

Because the size and thickness of each configuration shown in the drawings are arbitrarily shown for better understanding and ease of description, the present invention is not limited thereto, and the thicknesses of portions and regions are exaggerated for clarity. In the drawings, the thickness of layers, films, panels, regions, etc., are exaggerated for clarity. In addition, in the drawings, the thickness of some layers and regions is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising" will be understood to imply the inclusion of stated elements but not the exclusion of any other elements.

Hereinafter, a touch apparatus and a driving method thereof according to exemplary embodiments will be described with reference to necessary drawings.

Figure 2:
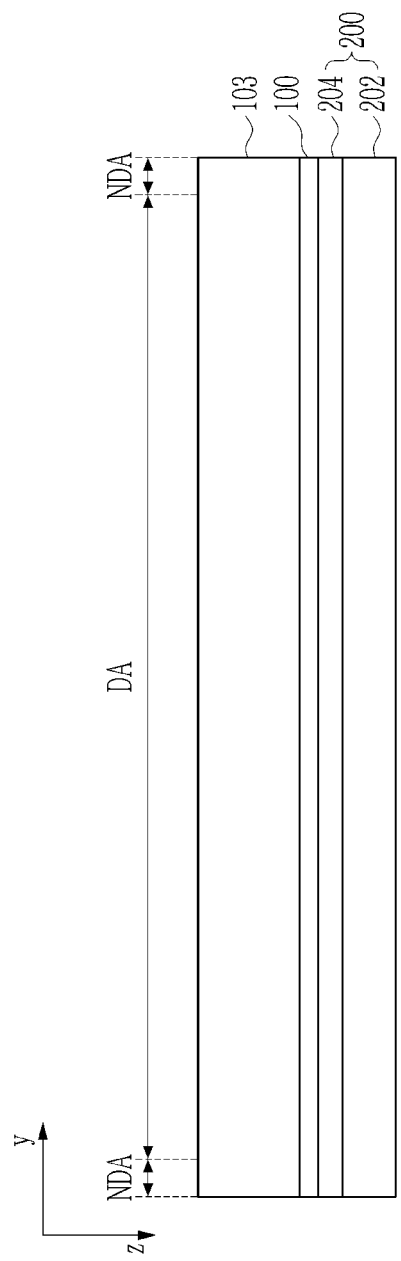
FIG. 2 is a cross-sectional view of FIG. 1, taken along the line I-I'.

FIG. 1 is a schematic top plan view of a part of a display device including a touch apparatus according to an exemplary embodiment, and FIG. 2 is a cross-sectional view of FIG. 1, taken along the line I-I'.

Referring to FIG. 1 and FIG. 2, a display panel 200 may display arbitrary visual information, for example, text, video, photos, 2D or 3D images, and the like through the entire side. The type of the display panel 200 is not particularly limited as long as it can display an image. In the exemplary embodiment, the display panel 200 is exemplarily illustrated as a panel having an organic light emitting diode as a light emitting element. However, the type of the display panel 200 is not particularly limited thereto, and any display panel may be used within the limits corresponding to the concept of the present invention.

The display panel 200 may have various shapes. For example, the display panel 200 may be formed in the shape of a rectangle having two pair of sides that parallel with each other. For better understanding and ease of description, the display panel 200 is illustrated as a rectangle having a pair of long sides and a pair of short sides.

However, the shape of the display panel 200 is not limited thereto, and the display panel 200 may have various shapes. For example, the display panel 200 may have various shapes such as a polygon of a closed shape including a side of a straight line, a circle, an ellipse, and the like including a side made of a curved line, and a semi-circle, a half oval, and the line including a side made of a straight line and a curved line. At least a part of corners of the display panel 200 may have a curved form.

The display panel 200 may be wholly or at least partially flexible.

The display panel 200 may display an image. The display panel 200 includes a display portion 204, and the display portion 204 may include a display area DA where an image is displayed and a non-display area NDA that is disposed at at least one side of the display area DA. For example, the non-display area NDA may surround the display area DA. A plurality of pixels PX may be located in the display area DA, and a driver 210 (refer to FIG. 3) that drives the plurality of pixel PX may be located in the non-display area NDA.

The display area DA may have a shape corresponding to the shape of the display panel 200. For example, like the shape of the display panel 200, the display area DA may have various shapes such as a polygon of a closed shape including a side of a straight line, a circle, an ellipse, and the like including a side made of a curved line, and a semi-circle, a half oval, and the line including a side made of a straight line and a curved line. In the exemplary embodiment of the present invention, the display area DA is exemplarily formed in the shape of a rectangle.

The display panel 200 may include a substrate 202 and the display portion 204 provided on the substrate 202.

The substrate 202 may be formed of various materials, for example, glass, a polymer metal, and the like. The substrate 202 may be an insulating substrate formed of a particularly high molecular organic material. An insulating substrate material including a polymer organic material includes polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, and the like. However, the material of the substrate 202 is not limited thereto, and for example, the substrate 202 may be formed of a fiberglass-reinforced plastic (FRP).

The display portion 204 may be located on the substrate 202. The display portion 204 may display user input information or information provided to a user as an image. The display portion 204 may include a plurality of pixels PX. The plurality of pixels PX may be organic light emitting elements including an organic layer, but this is not restrictive, and may be implemented in various forms, such as such as liquid crystal devices, electrophoretic devices, and electrowetting devices. Each pixel PX is a minimum unit displaying an image, and may include an organic light emitting element that emits light of white and/or colored light. Each pixel PX may emits light of any one of red, green, blue, and white, but this is not restrictive, and may emit light of cyan, magenta, yellow, and the like. Each pixel PX may include transistors (not shown) connected to a plurality of signal wires (not shown), and an organic light emitting diode electrically connected to the transistors.

The touch panel 100 may be attached on the display portion 204 in the form of a separate panel or film, or may be integrally formed with the display portion 204.

The touch panel 100 may include a plurality of touch sensing units TS for detecting a location of a touch when there is a user's touch. The touch sensing unit TS may detect a touch using a mutual capacitance method or a self capacitance method. The touch panel 100 receives a driving signal from a touch controller 102 (refer to FIG. 3). The touch controller 102 may receive a detection signal that is changed according to a user's touch, from the touch panel 100.

A window 103 may be disposed on the touch panel 100. The window 103 may have a shape that corresponds to the shape of the display panel 200, and may cover at least a part of the front side of the display panel 200. For example, when the display panel 200 has a rectangular shape, the window 103 may also have a rectangular shape. Alternatively, when the display panel 200 has a circular shape, the window 103 may also have a circular shape.

An image displayed on the display panel 200 is transmitted to the outside through the window 103. The window 103 mitigates external impact to prevent damage or malfunction of the display panel 200 due to the external impact. External impact is a force from the outside, which can be expressed as pressure, stress, and the like, and may imply a force that causes a defect to occur in the display panel 200.

The window 103 may wholly or at least partially flexible.

Figure 3:
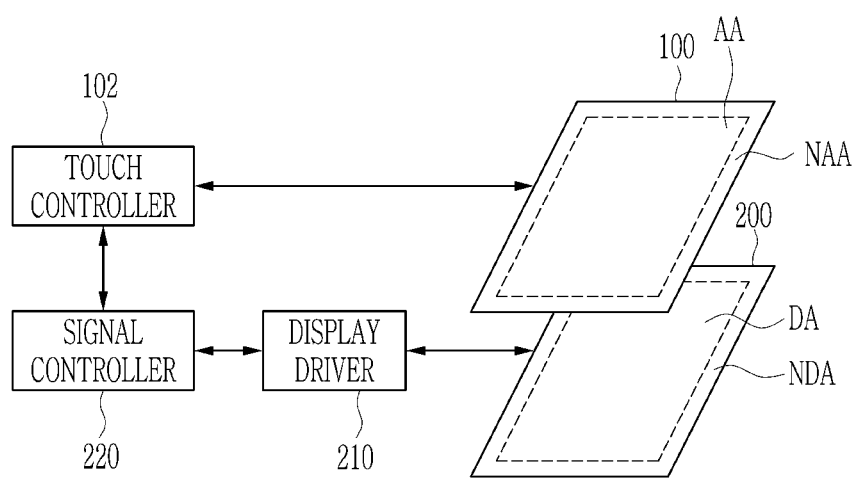
FIG. 3 is a block diagram of the display apparatus and a touch apparatus according to an exemplary embodiment.

FIG. 3 is a block diagram of the display apparatus and a touch apparatus according to an exemplary embodiment. Referring to FIG. 3, the display panel 200 is connected to a display driver 210, and the touch panel 100 is connected to the touch controller 102.

The display driver 210 includes a scan driver and a data driver that supply signals to the pixels PX included in the display panel 200. A signal controller 220 supplies a driving control signal and image data to the display driver 210 to control an image display operation of the display panel 200.

Specifically, the signal controller 220 may generate the driving control signal and the image data by using an image signal and data enable signal supplied from an external image source. For example, the signal controller 220 may receive an image signal and a control signal from an external source (not shown), and the control signal may include a vertical synchronization signal, which is a signal for distinguishing frame sections, a horizontal synchronization signal, which is a signal for distinguishing rows in one frame, and a data enable signal that is high level only for a section during which data is output, and clock signals. In addition, the driving control signal may include a scan driving control signal, a data driving control signal, and the like.

The scan driver generates scan signals based on a scan driving control signal provided from the signal controller 220, and outputs the scan signals to scan lines connected to the pixels PX. The data driver generates gray voltages according to the image data provided from the signal controller 220 based on the data driving control signal received from the signal controller 220. The data driver outputs the gray voltages as data voltages to data lines connected to the pixels PX.

Meanwhile, the scan driver may be simultaneously formed with the pixels PX through a thin film process. For example, the scan driver may be mounted in the non-display area NDA in the form of an amorphous silicon TFT gate driver circuit (ASG), or an oxide semiconductor TFT gate driver circuit (OSG).

The touch controller 102 may generate a driving signal output to the touch panel 100, and may receive a detection signal input from the touch panel 100. In addition, the touch controller 102 may determine whether a touch is input to a touch screen, the number of touch inputs, and positions of the touch inputs using the driving signal and the detection signal.

The touch controller 102 may receive a horizontal synchronization signal, a scan driving control signal, a data driving control signal, and the like from the signal controller 220. The touch controller 102 may adjust a frequency of the driving signal provided to the touch panel 100 based on the horizontal synchronization signal. For example, the touch controller 102 may set the frequency of the driving signal by two or more integer times the frequency of the horizontal synchronization signal.

In addition, the touch controller 102 may receive the detection signal from the touch panel 100 for a period during which the scan signal has a disable level based on at least one of the horizontal synchronization signal and the scan driving control signal.

In addition, the touch controller 102 may receive the detection signal from the touch panel 100 for a period excluding a period during which the data signal is applied to the data line of the display portion 200, based on at least one of the horizontal synchronization signal and the data driving control signal.

In the exemplary embodiment of FIG. 3, the touch panel 100 and the display panel 200 are separated from each other, but the present invention is not limited thereto. For example, the touch panel 100 and the display panel 200 may be integrally manufactured.

The touch panel 100 may be provided on at least an area of the display panel 200. For example, the touch panel 100 may be provided to be overlapped with the display panel 200 on at least one side of the display panel 200. For example, the touch panel 100 may be disposed on one side (e.g., a top surface) in a direction in which an image is emitted among both surfaces of the display panel 200.

In addition, the touch panel 100 may be directly formed on at least one side of both sides of the display panel 200, or may be formed inside the display panel 200. For example, the touch panel 100 may be directly formed on an external side of an upper substrate (or an encapsulation layer) or an external side of a lower substrate (e.g., the top surface of the upper substrate or the bottom surface of the lower substrate), or may be directly formed on an internal side of the upper substrate or an internal side of the lower substrate (e.g., the bottom surface of the upper substrate or the top surface of the lower substrate).

When the touch panel 100 is directly formed on the encapsulation layer of the display panel 200, the entire thickness of the encapsulation layer may be about 4 μm to about 10 μm.

The touch panel 100 includes an active area AA where a touch input can be sensed, and an inactive area NAA that surrounds at least a part of the active area AA. Depending on exemplary embodiments, the active area AA may be disposed corresponding to the display area DA of the display panel 200, and the inactive area NAA may be disposed corresponding to the non-display area NDA of the display panel 200. For example, the active area AA of the touch panel 100 may overlap the display area DA of the display panel 200, and the inactive area NAA of the touch panel 100 may overlap the non-display area NDA of the display panel 200.

Depending on exemplary embodiments, a plurality of touch sensing units TS are arranged in the active area AA. That is, the active area AA may be a touch sensing area where a user's touch input can be sensed.

Figure 4:
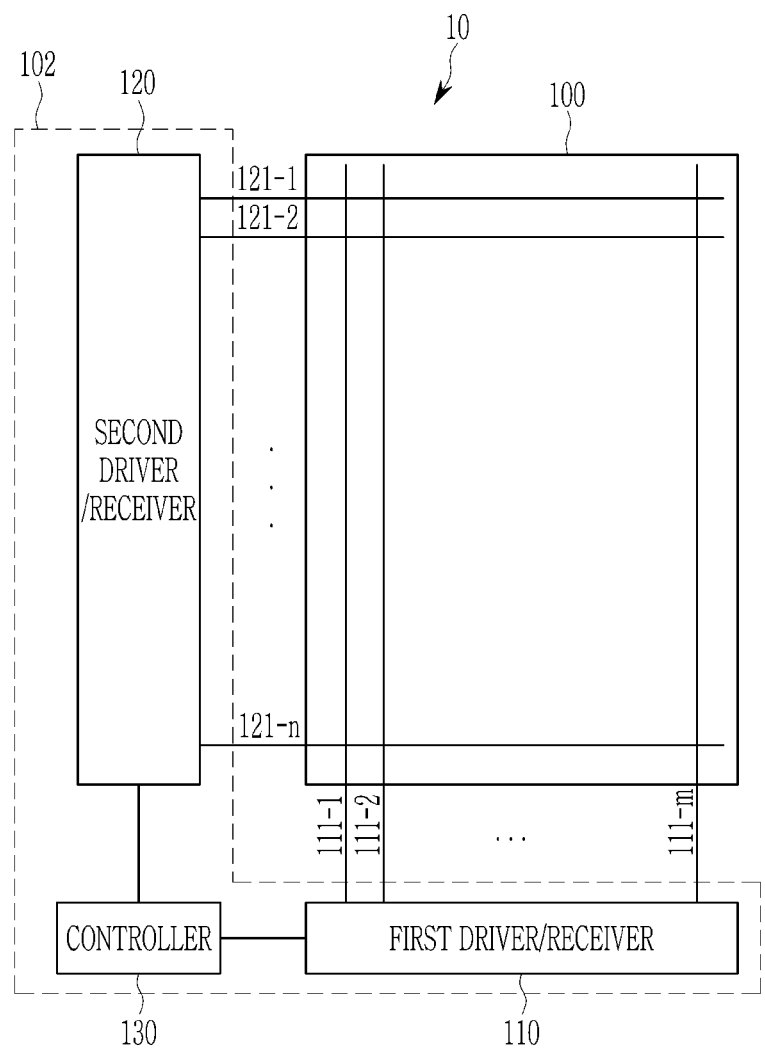
FIG. 4 is a schematic view of a touch apparatus according to an exemplary embodiment.

The plurality of touch sensing units TS include at least one touch electrode for detecting a touch input, for example, in case of mutual capacitance, and includes a plurality of first touch electrodes 111-1 to 111-$m$ of FIG. 4 and a plurality of second touch electrodes 121-1 to 121-$n$ of FIG. 4. Specifically, the one touch sensing unit TS may be a unit for detecting a change in capacitance formed by crossing one first touch electrode and one second touch electrode.

In case of self capacitance, the plurality of touch sensing units TS include a plurality of touch electrodes arranged in a matrix format. Specifically, one touch sensing unit TS may be a unit for detecting a change in capacitance of one touch electrode.

Depending on exemplary embodiments, at least one touch electrode may be provided on the display area DA of the display panel 200. In this case, at least one touch electrode may overlap at least one of electrodes and wires provided in the display panel 200 on a plane. For example, when the display panel 200 is provided as an organic light emitting display panel, at least one touch electrode may at least overlap a cathode, a data line, a scan line, and the like. When the display panel 200 is a liquid crystal display panel, at least one touch electrode may at least overlap a common electrode, a data line, a gate line, and the like.

As described, when the touch panel 100 is coupled with the display panel 200, parasitic capacitance is generated between the touch panel 100 and the display panel 200. For example, at least one touch electrode of the touch panel 100 may be disposed to be overlapped with at least one of the electrodes and the wires of the display panel 200 on a plane, and accordingly, the parasitic capacitance is generated between the touch panel 100 and the display panel 200.

Due to coupling of the parasitic capacitance, a signal of the display panel 200 may be transmitted to the touch sensor, particularly, the touch panel 100. For example, a noise signal due to a display driving signal (e.g., a data signal, a scan signal, a light emission control signal, and the like) applied to the display panel 200 may be introduced into the touch panel 100.

In the touch apparatus according to the exemplary embodiment, the display panel 200 may be an organic light emitting display panel having a thin film encapsulation layer, and the touch panel 100 may be formed of on-cell type of sensor electrodes such that at least one touch electrode is directly formed on one side (e.g., the top surface) of the thin film encapsulation layer. In this case, at least one of electrodes and wires provided in the organic light emitting display panel, and at least one touch electrode are disposed adjacent to each other. Accordingly, the noise signal according to display driving may be transmitted to the touch panel 100 with relatively high intensity.

The noise signal transmitted to the touch panel 100 causes a ripple of the detection signal, and accordingly, sensitivity of the touch sensor may be deteriorated. Accordingly, in the present disclosure, various exemplary embodiments capable of improving the sensitivity of the touch sensor will be provided, and detailed description thereof will be described later.

Figure 5:
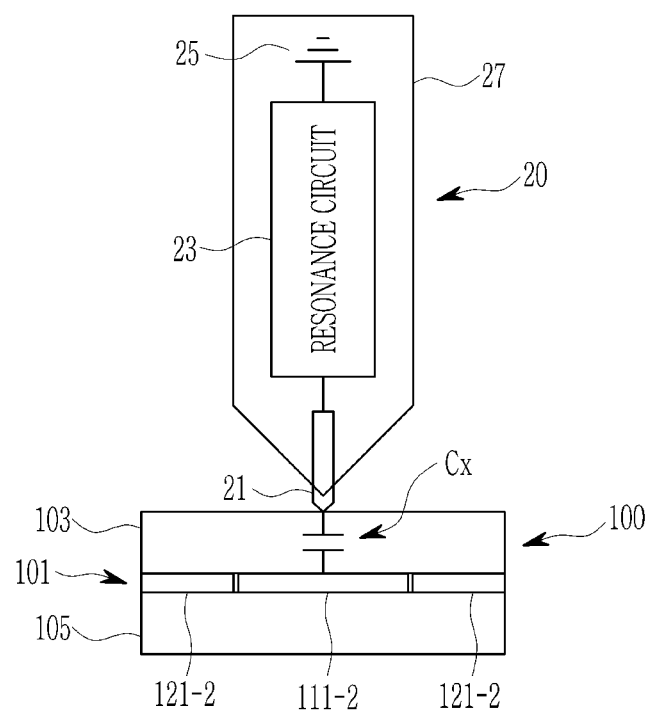
FIG. 5 shows an example in which a stylus pen touches the touch apparatus according to the exemplary embodiment.

FIG. 4 is a schematic view of a touch apparatus according to an exemplary embodiment, and FIG. 5 shows an example in which a stylus pen touches the touch apparatus according to the exemplary embodiment.

Referring to FIG. 4, a touch apparatus 10 according to an exemplary embodiment includes a touch panel 100, and a touch controller 102 that controls the touch panel 100. The touch controller 102 may include first and second driver/receivers 110 and 120 that transmit and receive a signal to and from the touch panel 100, and a controller 130.

The touch panel 100 includes a plurality of first touch electrodes 111-1 to 111-$m$ extending in a first direction, and a plurality of second touch electrodes 121-1 to 121-$n$ extending in a second direction that crosses the first direction. In the touch panel 100, the plurality of first touch electrodes 111-1 to 111-$m$ may be arranged along the second direction, and the plurality of second touch electrodes 121-1 to 121-$n$ may be arranged in the first direction. In FIG. 4, the touch panel 100 is illustrated to have a quadrangle shape, but this is not restrictive.

As shown in FIG. 5, the touch panel 100 includes a substrate 105 (e.g., an external side of an upper substrate (or an encapsulation layer) of the display panel 200) and a window 103. The plurality of first touch electrodes 111-1 to 111-$m$ and the plurality of second touch electrodes 121-1 to 121-$n$ may be disposed on the substrate 105. In addition, the window 103 may be disposed on the plurality of first touch electrodes 111-1 to 111-$m$ and the plurality of second touch electrodes 121-1 to 121-$n$. In FIG. 5, the plurality of first touch electrodes 111-1 to 111-$m$ and the plurality of second touch electrodes 121-1 to 121-$n$ are disposed in the same layer, but they may be disposed in different layers, and this is not restrictive.

The plurality of first touch electrodes 111-1 to 111-$m$ are connected to the first driver/receiver 110, and the plurality of second touch electrodes 121-1 to 121-$n$ are connected to the second driver/receiver 120. In FIG. 4, the first driver/receiver 110, the second driver/receiver 120, and the controller 130 are separated from each other, but they may be implemented as a single module, unit, and chip, and this is not restrictive.

The first driver/receiver 110 may apply a driving signal to the plurality of first touch electrodes 111-1 to 111-$m$. In addition, the first driver/receiver 110 may receive a detection signal from the plurality of first touch electrodes 111-1 to 111-$m$. The second driver/receiver 120 may apply a driving signal to the plurality of second touch electrodes 121-1 to 121-$n$. In addition, the second driver/receiver 120 may receive a detection signal from the plurality of second touch electrodes 121-1 to 121-$n$. That is, the first driver/receiver 110 and the second driver/receiver 120 may be transceivers that transmit and receive signals, and may respectively include drivers and receivers.

The driving signal may include a signal (e.g., a sine wave, a square wave, and the like) having a frequency that corresponds to a resonance frequency of the stylus pen 20. The resonance frequency of the stylus pen 20 depends on a designed value of a resonance circuit portion 23 of the stylus pen 20.

The touch apparatus 10 may be used to sense a touch input (i.e., direct touch or proximity touch) by a touch object. As shown in FIG. 5, a touch input of the stylus pen 20 that is close to the touch panel 100 may be sensed by the touch apparatus 10.

The stylus pen 20 may include a conductive tip 21, a resonance circuit portion 23, a ground 25, and a body 27.

The conductive tip 21 may be at least partially formed of a conductive material (e.g., a metal, conductive rubber, fabric, conductive silicon, and the like), and may be electrically connected to the resonance circuit 23.

The resonance circuit 23 is an LC resonance circuit, and may resonate with a driving signal applied to all electrodes of at least one type of the plurality of first touch electrodes 111-1 to 111-$m$ and the plurality of second touch electrodes 121-1 to 121-$n$ from at least one of the first driver/receiver 110 and the second driver/receiver 120 through the conductive tip 21.

A resonance signal generated from the resonance circuit 23 resonated with the driving signal may be output to the touch panel 100 through the conductive tip 21. The resonance signal due to resonance of the resonance circuit 23 may be transmitted to the conductive tip 21 in a section during which the driving signal is applied to all electrodes of at least one type of the plurality of first touch electrodes 111-1 to 111-*m* and the plurality of second touch electrodes 121-1 to 121-*n* and a section thereafter. The resonance circuit 23 is disposed in the body 27, and may be electrically connected to the ground 25. Such a stylus pen 20 generates a resonance signal in response to the driving signal applied to at least one of the touch electrodes 111-1 to 111-*m* and 121-1 to 121-*n* such that a touch input can be generated.

Capacitance Cx is formed by at least one of the touch electrodes 111-1 to 111-*m* and 121-1 to 121-*n*, and the conductive tip 21 of the stylus pen 20. The driving signal may be transmitted to the stylus pen 20 and the resonance signal may be transmitted to the touch panel 100 through the capacitance Cx formed between at least one of the touch electrodes 111-1 to 111-*m* and 121-1 to 121-*n*, and the conductive tip 21.

The touch apparatus 10 may detect a touch made by a touch object (e.g., a user's body part (finger, palm, etc.) or a passive or active type of stylus pen) in addition to the stylus pen 20 of the above-described type, which generates the resonance signal, but this is not restrictive.

For example, the touch apparatus 10 detects a touch made by a stylus pen that receives an electrical signal and outputs the electrical signal as a magnetic field signal. For example, the touch apparatus 10 may further include a digitizer. A magnetic field signal, which is electromagnetically resonated (or induced by an electron group) by a stylus pen, is detected by the digitizer, whereby a touch can be detected. Alternatively, the touch apparatus 10 detects a touch by a stylus pen that receives a magnetic field signal and outputs the magnetic field signal as a resonated magnetic field signal. For example, the touch apparatus 10 may further include a coil that applies a current as a driving signal, and a digitizer. The stylus pen resonates with a magnetic field signal generated from the coil to which the current is applied. In the stylus pen, the magnetic field signal resonated with an electromagnetically resonated (or electromagnetically induced) signal is detected by the digitizer whereby a touch can be detected.

The controller 130 controls the overall driving of the touch apparatus 10, and may output touch information using detection signals transmitted from the first driver/receiver 110 and the second driver/receiver 120.

Next, referring to FIG. 6, a driving method of the touch apparatus according to an exemplary embodiment will be described.

Figure 6:
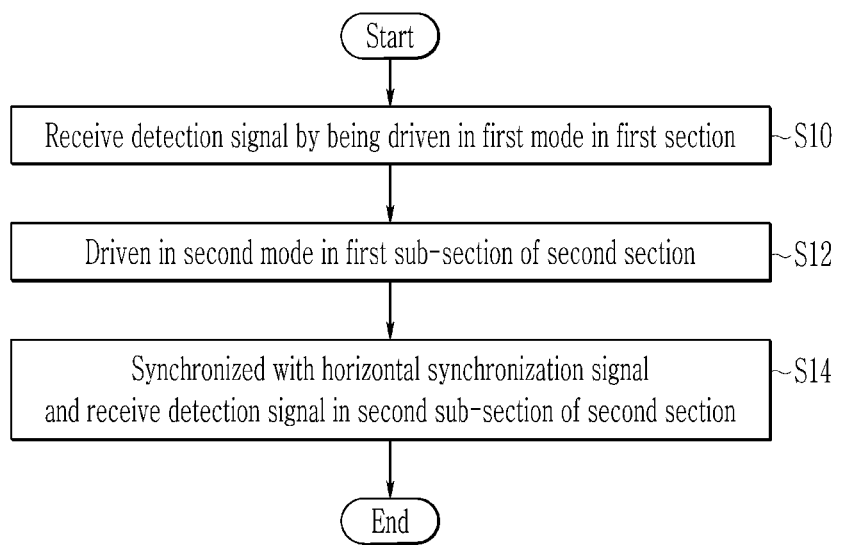
FIG. 6 is a flowchart of a driving method of the touch apparatus according to an exemplary embodiment.

FIG. 6 is a flowchart of a driving method of the touch apparatus according to an exemplary embodiment.

In a first section, the touch apparatus 10 is driven in a first mode (S10). The first mode is a mode in which a driving signal for detection of a touch input by a touch object other than the stylus pen 20 is applied to the touch panel 100.

For example, in the first mode, the first driver/receiver 110 outputs a driving signal to the plurality of first touch electrodes 111-1 to 111-*m*, and the second driver/receiver 120 receives a detection signal according to a touch from the plurality of second touch electrodes 121-1 to 121-*n*.

The controller 130 determines whether the detection signal is a valid touch signal based on whether the intensity of the detection signal acquired in the first section exceeds a first threshold, and acquires touch coordinate information by using the valid touch signal.

For example, the controller 130 calculates touch coordinates by using the detection signal when the intensity of the detection signal acquired in the first section excesses the first threshold. When the intensity of the detection signal acquired in the first section is less than the first threshold, the controller 130 does not calculate touch coordinates according to a detection signal of which intensity is less than the first threshold. In addition, when the intensity of the detection signal acquired in the first section exceeds the first threshold, the controller 130 may calculate a touch area by using the detection signal. The detection signal acquired in the first section includes at least one of a first detection signal by a user's body part (e.g., finger, palm, and the like) and a second detection signal by the stylus pen 20 and a passive type of a stylus pen. The first threshold value may be set such that the first detection signal is determined as a valid touch signal and the second detection signal is filtered.

In a first sub-section of a second section, the touch apparatus 10 is driven in a second mode (S12). The second mode is a mode in which a driving signal for detecting a touch input by the stylus pen 20 is applied to the touch panel 100. For example, the first driver/receiver 110 simultaneously applies a driving signal to all of the plurality of first touch electrodes 111-1 to 111-*m*.

Although it is described that the first driver/receiver 110 applies the driving signal to all of the plurality of first touch electrodes 111-1 to 111-*m* in the first sub-section, this is not restrictive. For example, the first driver/receiver 110 may apply the driving signal to at least one of the plurality of first touch electrodes 111-1 to 111-*m* in the first sub-section of the second section. Alternatively, the first driver/receiver 110 may simultaneously apply the driving signal to all of the plurality of first touch electrodes 111-1 to 111-*m* in the first sub-section of the second section. Alternatively, the second driver/receiver 120 may simultaneously apply the driving signal to at least one of the plurality of second touch electrodes 121-1 to 121-*n* in the first sub-section of the second section. Alternatively, the second driver/receiver 120 may simultaneously apply the driving signal to all of the plurality of second touch electrodes 121-1 to 121-*n* in the first sub-section of the second section. Alternatively, the first driver/receiver 110 and the second driver/receiver 120 may simultaneously apply the driving signal to at least one of the plurality of first touch electrodes 111-1 to 111-*m* and at least one of the plurality of second touch electrodes 121-1 to 121-*n* in the first sub-section of the second section. The first driver/receiver 110 and the second driver/receiver 120 may simultaneously apply the driving signal to all of the plurality of first touch electrodes 111-1 to 111-*m* and all of the plurality of second touch electrodes 121-1 to 121-*n*. When the first driver/receiver 110 and the second driver/receiver 120 simultaneously apply the driving signal to all of the plurality of first touch electrodes 111-1 to 111-*m* and all of the plurality of second touch electrodes 121-1 to 121-*n*, the driving signal applied to the plurality of first touch electrodes 111-1 to 111-*m* and the driving signal applied to the plurality of second touch electrodes 121-1 to 121-*n* may have the same phase or different phases.

A frequency of the driving signal applied to the touch panel 100 in the first section is assumed to be lower than a frequency of the driving signal applied to the touch panel 100 in the first sub-section. In addition, a frequency of the driving signal applied to the touch panel 100 may be two or more integer times a frequency of the horizontal synchronization signal of the signal controller in the first sub-section.

In a second sub-section of the second section, the touch apparatus 10 receives a detection signal that is resonated based on a driving signal at least once (S14).

For example, the resonance circuit portion 23 of the stylus pen 20 is resonated with the driving signal such that a resonance signal is generated and transmitted to the touch panel 100 through the conductive tip 21.

In the exemplary embodiment, the first driver/receiver 110 receives a at least one detection signal transmitted from the plurality of first touch electrodes 111-1 to 111-*m*, and the second driver/receiver 120 also receives at least one detection signal transmitted from the plurality of second touch electrodes 121-1 to 121-*n*. In this case, the first driver/receiver 110 and the second driver/receiver 120 may receive the detection signals at the same timing. In addition, the first driver/receiver 110 and the second driver/receiver 120 may process the received detection signals and transmit the processed detection signals to the controller 130.

In the above description, in the second sub-section, the first driver/receiver 110 receives the detection signals transmitted from the plurality of first touch electrodes 111-1 to 111-*m* and the second driver/receiver 120 also receives the detection signals from the plurality of second touch electrodes 121-1 to 121-*n*, but in the second sub-section of the second section, the first driver/receiver 110 may receive a detection signal from at least one of the plurality of first touch electrodes 111-1 to 111-*m* and the second driver/receiver 120 may also receive a detection signal from at least one of plurality of second touch electrodes 121-1 to 121-*n*, or in the second sub-section of the second section, only the first driver/receiver 110 may receive a detection signal from at least one of the plurality of first touch electrodes 111-1 to 111-*m*, or in the second sub-section of the second section, only the second driver/receiver 120 may receive a detection signal from at least one of the plurality of second touch electrodes 121-1 to 121-*n*, and detection signal receiving operation of the first driver/receiver 110 and the second driver/receiver 120 is not limited thereto.

Alternatively, in the second sub-section, the first driver/receiver 110 may receive a detection signal from at least one of the plurality of first touch electrodes 111-1 to 111-*m* or may receive detection signals from all of the plurality of first touch electrodes 111-1 to 111-*m*, and the second driver/receiver 120 may also receive a detection signal from at least one of the plurality of second touch electrodes 121-1 to 121-*n* or may receive detection signals from all of the plurality of second touch electrodes 121-1 to 121-*n*.

The controller 130 generates touch information by using some detection signals received in a period determined in response to a horizontal synchronization signal among detection signals received at least once by the first driver/receiver 110 and the second driver/receiver 120.

In another exemplary embodiment, the first driver/receiver 110 is synchronized with the horizontal synchronization signal and receives detection signals transmitted from the plurality of first touch electrodes 111-1 to 111-*m*, and the second driver/receiver 120 is also synchronized with the horizontal synchronization signal and receive detection signals transmitted from the plurality of second touch electrodes 121-1 to 121-*n*. In addition, the first driver/receiver 110 and the second driver/receiver 120 process the received detection signals and may transmit the processed signals to the controller 130.

The controller 130 is synchronized with the horizontal synchronization signal and generates touch information by using the detection signals received by the first driver/receiver 110 and the second driver/receiver 120.

The controller 130 determines whether the detection signal is a valid touch signal based on whether intensity of the detection signal acquired in the second sub-period exceeds a second threshold value, and may acquire touch coordinate information at a location where a touch of the stylus pen 20 is made by using the valid touch signal.

For example, the controller 130 calculates touch coordinates by using a detection signal acquired in the second sub-section when the intensity of the detection signal exceeds the second threshold value. When the intensity of the detection signal acquired in the second sub-section is less than the second threshold value, the controller 130 does not calculate touch coordinates according to a detection signal of which intensity is less than the second threshold value. In addition, when the intensity of the detection signal acquired in the second sub-section exceeds the second threshold value, the controller 130 may calculate a touch area by using the detection signal.

Next, referring to FIG. 7, driving signals applied in first and second sections, a resonance signal of the stylus pen 20, and detection signals will be described.

Figure 7:
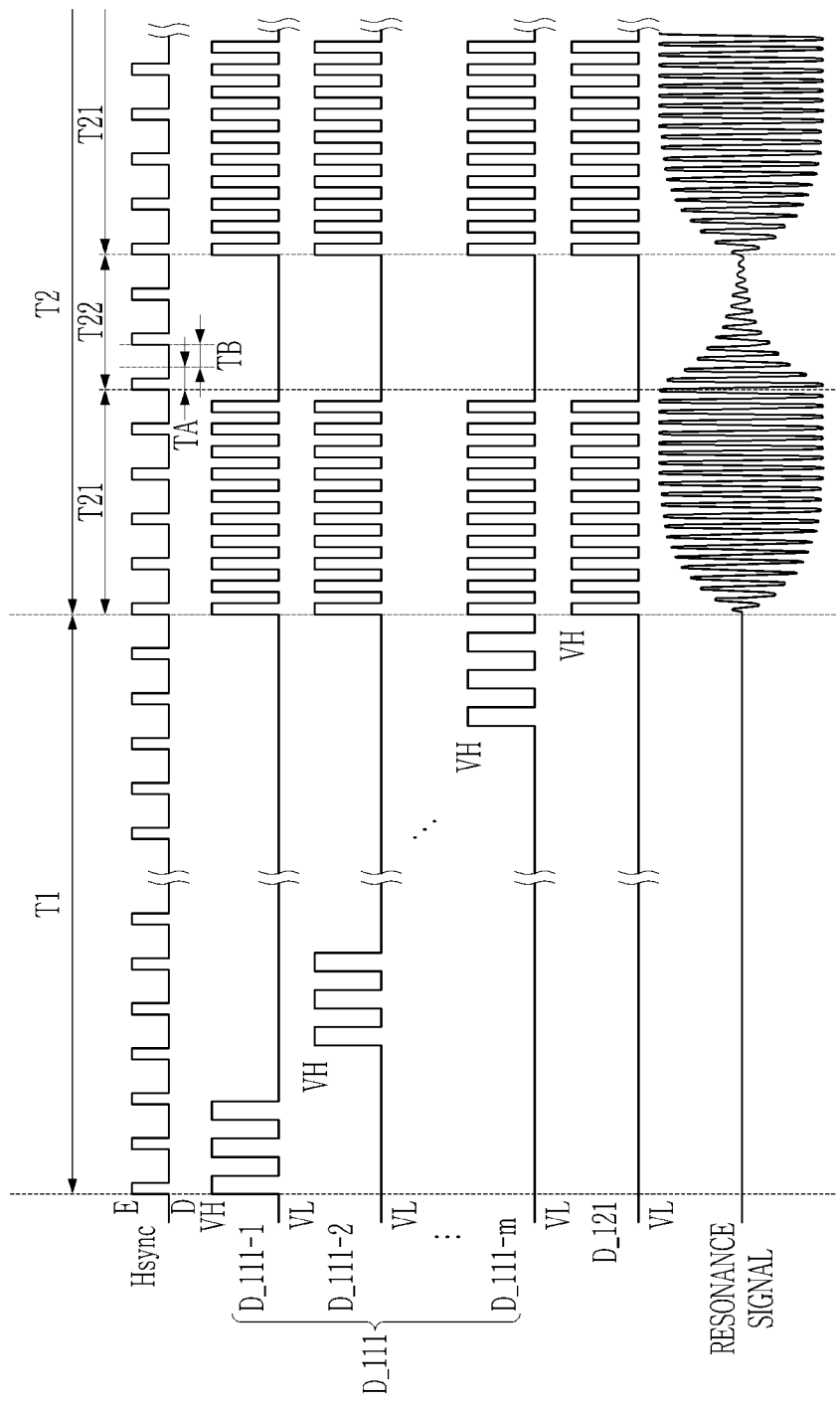
FIG. 7 is an exemplary timing diagram of a horizontal synchronization signal Hsycn and a driving signal according to the driving method of FIG. 6.

FIG. 7 is an exemplary timing diagram of a horizontal synchronization signal Hsycn and a driving signal according to the driving method of FIG. 6.

One touch report frame period according to a touch report rate includes a first section T1 and a second section T2. The touch report rate implies a speed or frequency (Hz) in which the touch apparatus 10 outputs touch data obtained by driving touch electrodes to an external host system.

In the first section T1, the first driver/receiver 110 outputs driving signals to touch electrodes of at least one type of the plurality of first touch electrodes 111-1 to 111-*m* and the plurality of second touch electrodes 121-1 to 121-*n*. When the first driver/receiver 110 outputs the driving signal to the plurality of first touch electrodes 111-1 to 111-*m*, the second driver/receiver 120 may receive detection signals from the plurality of second touch electrodes 121-1 to 121-*n*. The controller 130 may acquire touch coordinate information based on signal intensity of the detection signal.

In a first sub-section T21 of the second section T2, the first driver/receiver 110 simultaneously applies driving signals to the plurality of first touch electrodes 111-1 to 111-*m*, and the second driver/receiver 120 simultaneously applies driving signals to the plurality of second touch electrodes 121-1 to 121-*n*.

In the first sub-section T21, frequencies of the driving signals applied to the plurality of first touch electrodes 111-1 to 111-*m* and the plurality of second touch electrodes 121-1 to 121-*n* correspond to a resonance frequency of the stylus pen 20. For example, during the first sub-section T21, the frequency of the driving signal output to the plurality of first touch electrodes 111-1 to 111-*m* and the plurality of second touch electrodes 121-1 to 121-*n* may be two or more integer times a frequency of the horizontal synchronization signal. On the contrary, in the first section T1, the frequency of the driving signal output to the plurality of first touch electrodes 111-1 to 111-*m* is different from the frequency of the horizontal synchronization signal.

Such frequency setting of the driving signal is an example, and it may be set to a different value from the above-stated value. Specifically, the controller 130 may receive a horizontal synchronization signal Hsync, a scan driving control signal, a data driving control signal, and the like from the signal controller 220. Then, the controller 130 sets a frequency of a driving signal supplied to the touch panel 100 based on the horizontal synchronization signal Hsync, and may synchronize the driving signal with the horizontal synchronization signal Hsync. For example, the controller 130 may set the frequency of the driving signal to two or more integer times the frequency of the horizontal synchronization signal Hsync. Then, the resonance frequency of the stylus pen 20 may be designed to have two or more integer times the frequency of the horizontal synchronization signal Hsync. The controller 130 may synchronize the driving signal at pulses of the horizontal synchronization signal Hsync.

In a second sub-section T22 of the second section T2, the first driver/receiver 110 is synchronized with each pulse of the horizontal synchronization signal Hsync and thus receives detection signals from the plurality of first touch electrodes 111-1 to 111-$m$, and the second driver/receiver 120 is synchronized with each pulse of the horizontal synchronization signal Hsync and thus receives detection signals from the plurality of second touch electrodes 121-1 to 121-$n$. In addition, in the second sub-section T22, the first driver/receiver 110 and the second driver/receiver 120 may receive detection signals at least once.

In the second sub-section T22 where the driving signal is no longer applied, the resonance signal output by the resonance circuit 23 of the stylus pen 20 may be received by at least one of the plurality of first touch electrodes 111-1 to 111-$m$ and the plurality of second touch electrodes 121.

A pulse cycle of the horizontal synchronization signal Hsync is 1 horizontal period 1H required for writing data to pixels PX of one row. After each pulse of the horizontal synchronization signal Hsync is generated, a data signal may be written into pixels during a data writing period TA. The data writing period implies a period during which a data signal is applied to the data line for writing the data signal to the pixels PX, and a scan signal is applied to the scan line Since the data line and the scan line form parasitic capacitance with touch electrodes, a voltage applied to the data line and scan line during the data writing period TA causes noise in the detection signal transmitted to the touch electrode.

In the exemplary embodiment, the controller 130 may generate touch information by using a detection signal received in a noise free period TB, excluding the data writing period TA. The data writing period TA and the noise free period TB may be set differently according to the driving method of the display device and the display device.

Specifically, at each of a plurality of sampling times during the second sub-section T22, the first driver/receiver 110 receives detection signals from the plurality of first touch electrodes 111-1 to 111-$m$ and the second driver/receiver 120 receives detection signals from the plurality of second touch electrodes 121-1 to 121-$n$.

The controller 130 generates a receiving signal by using detection signals received at sampling times in the noise free period TB.

For example, when the controller 130 receives only the horizontal synchronization signal Hsync, the controller 130 may determine from a time when a pulse of a horizontal synchronization signal Hsync occurs to a predetermined data writing period TA from a predetermined first time to a predetermined second time, where the predetermined second time exceeds the predetermined first time, and this is not restrictive and can be variously set according to the driving method of the display device. Then, the controller 130 generates a receiving signal by using signals other than detection signals sampled during the data writing period TA.

Alternatively, when the controller 130 receives a scan driving control signal, the controller 130 may determine a period in which the detection signal has a disable level from the scan driving control signal as the data writing period TA. Then, the controller 130 generates a receiving signal by using signals other than detection signals sampled during the data writing period TA.

Alternatively, when the controller 130 receives a data driving control signal, the controller 130 may determine a period in which the data signal is applied to the data line from the data driving control signal as the data writing period TA. Then, the controller 130 generates a receiving signal by using signals other than detection signals sampled during the data writing period TA.

In another exemplary embodiment, the first driver/receiver 110 and the second driver/receiver 120 preferably receive detection signals during the noise free period TB, excluding the data writing period TA.

Specifically, the first driver/receiver 110 receives detection signals from the plurality of first touch electrodes 111-1 to 111-$m$ during the noise free period TB, excluding the data writing period TA. Similarly, the second driver/receiver 120 receives detection signals from the plurality of second touch electrodes 121-1 to 121-$n$.

That is, the controller 130 may receive a detection signal from the touch panel 100 for a period during which the scan signal has a disable level, based on at least one of the horizontal synchronization signal Hsync and the scan driving control signal. When the controller 130 receives a scan driving control signal, the controller 130 may determine a period during which the scan signal has a disable level. When the controller 130 receives only the horizontal synchronization signal Hsync, the controller 130 may determine a period from a time at which pulses of the horizontal synchronization signal Hsync are generated to after a predetermined fourth time from a predetermined third time as a period during which the scan signal has the disable level, and the predetermined fourth time exceeds the predetermined third time, but this is not restrictive and may be variously set according to a driving method of the display device 10.

In addition, the controller 130 may receive detection signals from the touch panel 100 during a period excluding a period during which the data signal is applied to the data line of the display portion 200 based on at least one of the horizontal synchronization signal Hsync and the data driving control signal. When the controller 130 receives the data driving control signal, the controller 130 may determine a period during which the data signal is applied to the data line from the data driving control signal. When the controller 130 receives only the horizontal synchronization signal Hsync, the controller 130 may determine a period from a time at which pulses of the horizontal synchronization signal Hsync are generated to after a predetermined sixth time from a predetermined fifth time as a period during which the scan signal has the disable level, and the predetermined fifth time exceeds the predetermined sixth time, but this is not restrictive and may be variously set according to a driving method of the display device 10.

The second section T2 includes a first sub-section T21 and a second sub-section T22. For example, in the second section T2, a combination of the first sub-section T21 and the second sub-section T22 may repeat eight times.

In the above, it was described that the second section T2 exists after the first section T1, but the first section T1 may exist after the second section T2, time lengths of the first section T1 and the second section T2 may be changed during a plurality of touch report frames, and the driving method of the touch apparatus 10 of the present exemplary embodiment is not limited thereto.

Next, referring to FIG. 8 to FIG. 10, the first and second driver/receivers 110 and 120 of the touch apparatus 10 will be described in detail.

Figure 8:
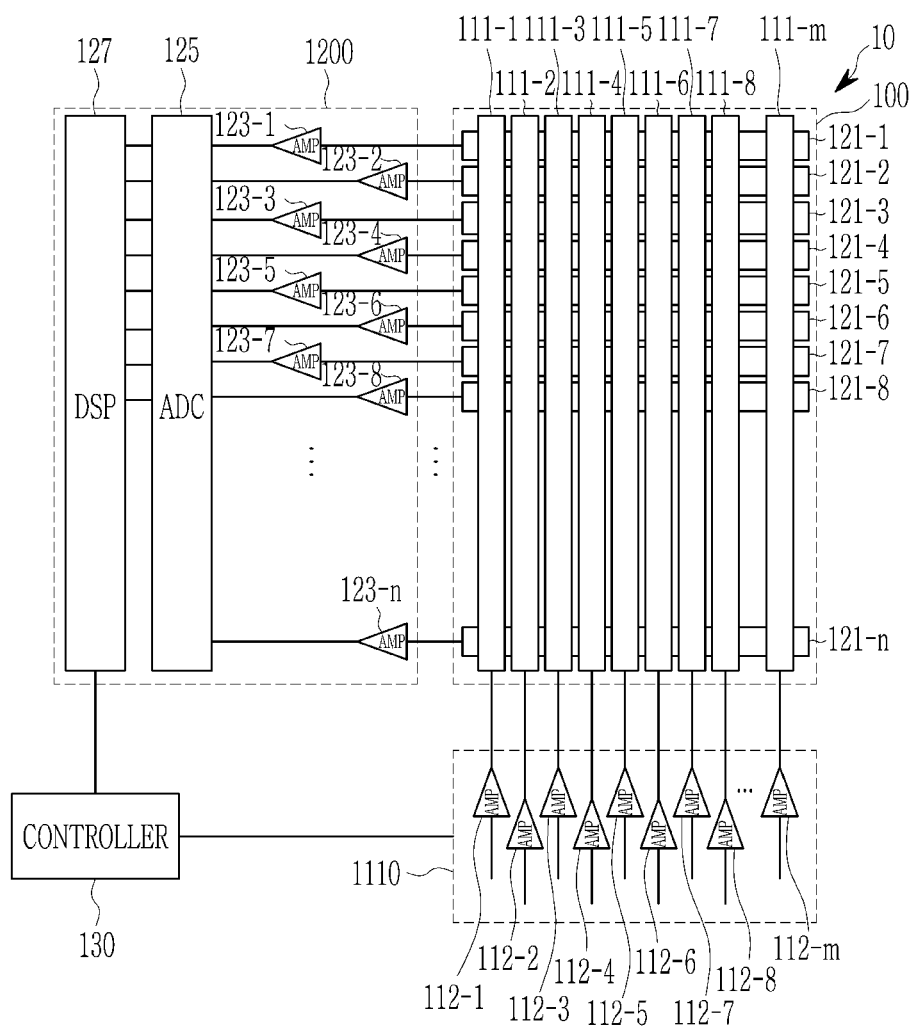
FIG. 8 to FIG. 10 show the touch apparatus of FIG. 4 in more detail.

FIG. 8 shows the touch apparatus 10 operating in the first section T1 in more detail. As shown in FIG. 8, a first driver 1110 of the first driver/receiver 110 includes a plurality of amplifiers 112-1 to 112-*m*. The plurality of amplifiers 112-1 to 112-*m* are connected with the plurality of first touch electrodes 111-1 to 111-*m* and output a first driving signal.

A second receiver 1200 includes a plurality of amplifiers 123-1 to 123-*n*, an ADC 125, and a signal processor (DSP) 127. The second driver/receiver 1200 may sequentially receive detection signals of the plurality of second touch electrodes 121-1 to 121-*n* as a single second touch electrode unit. Alternatively, the second driver/receiver 1200 may simultaneously receive the detection signals through the plurality of second touch electrodes 121-1 to 121-*n*. detection Each of the plurality of amplifiers 123-1 to 123-*n* is connected to a corresponding second touch electrode among the plurality of second touch electrodes 121-1 to 121-*n*. Specifically, each of the plurality of amplifiers 123-1 to 123-*n* may be implemented as an amplifier of which one of two input ends is connected with the ground or a DC voltage and a detection signal is input to the other input end. Each of the plurality of amplifiers 123-1 to 123-*n* amplifies and outputs detection signals transmitted from the plurality of second touch electrodes 121-1 to 121-*n* in parallel.

The ADC unit 125 converts the amplified detection signal into a digital signal. In addition, the signal processor 127 processes a plurality of amplified signals, which are converted into digital signals, and then transmit the processed signals to the controller 130.

Figure 9:
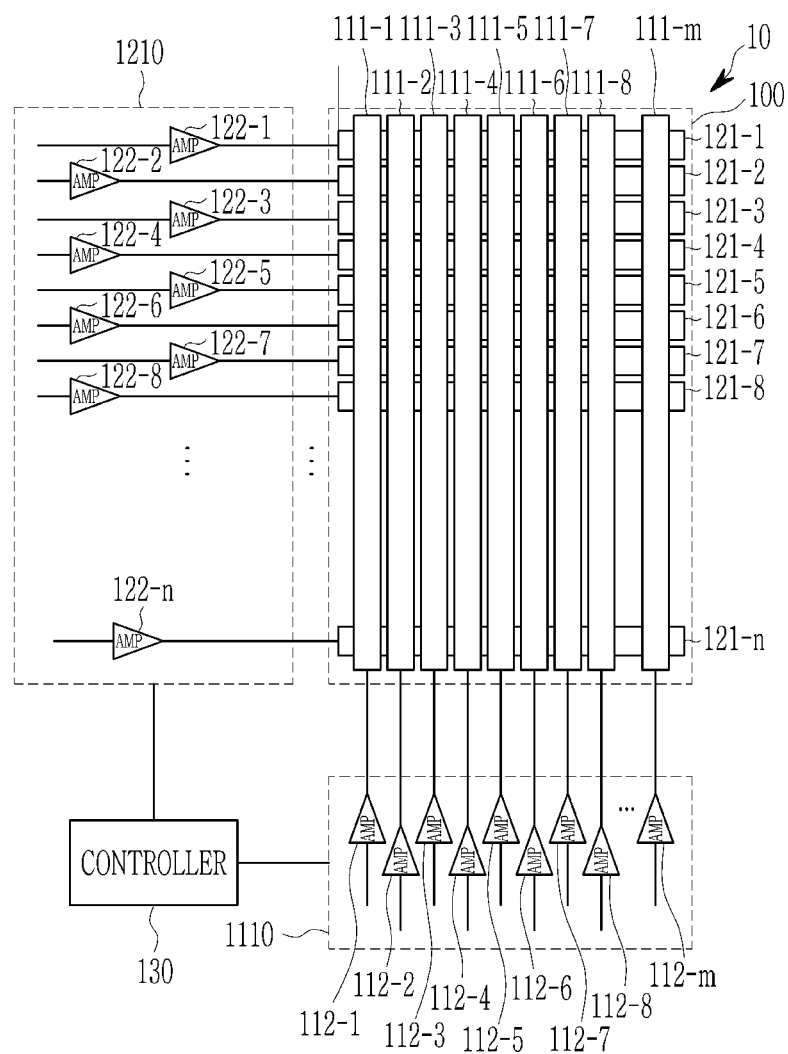

Next, FIG. 9 shows the touch apparatus 10 operating in a first sub-section T21 of the second section T2.

As shown in the drawing, a plurality of amplifiers 112-1 to 112-*m* of the first driver 1110 are connected to the plurality of first touch electrodes 111-1 to 111-*m* and output second driving signals. A second driver 1210 also includes a plurality of amplifiers 122-1 to 122-*n*. The plurality of amplifiers 122-1 to 122-*n* are connected to the plurality of first touch electrodes 121-1 to 121-*n* and output third driving signals.

Figure 10:
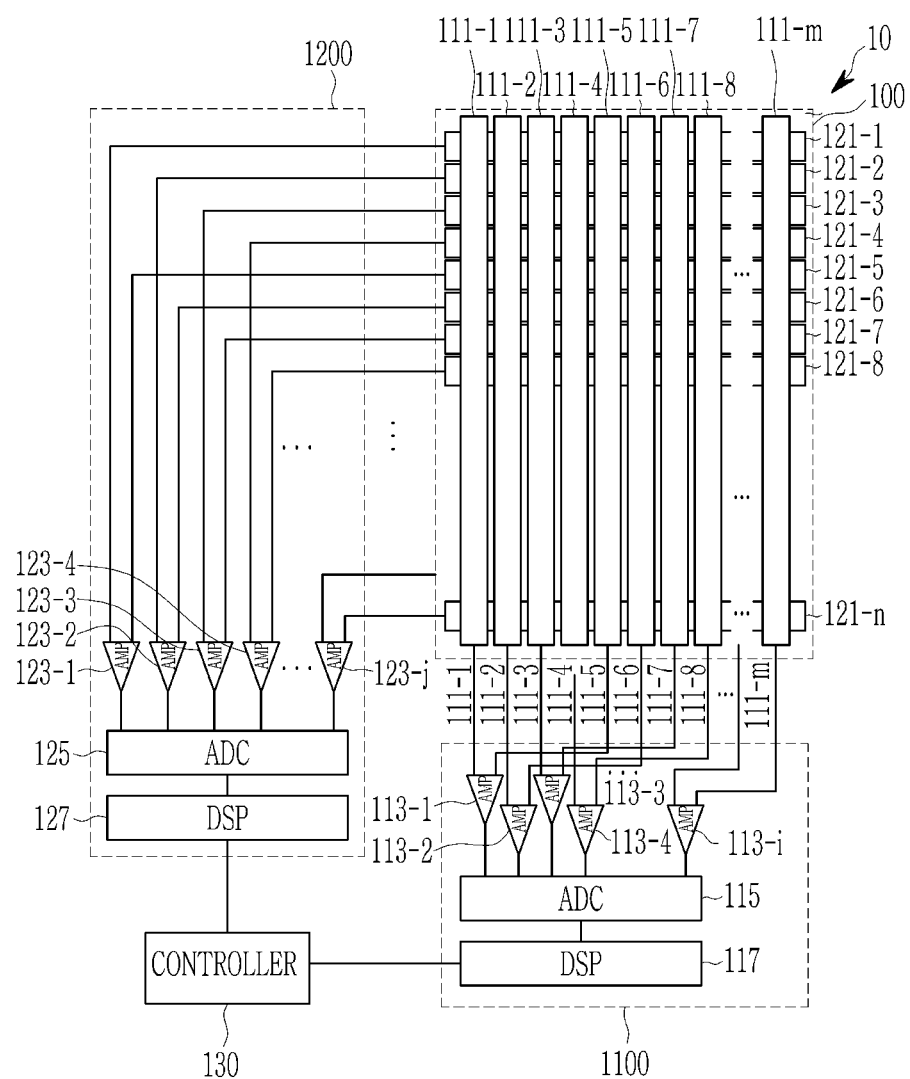

Next, FIG. 10 shows the touch apparatus 10 operating in a second sub-section T22 of the second section T2. As shown in the drawing, a first receiver 1100 includes a plurality of differential amplifiers 113-1 to 113-*i*, an ADC unit 115, and a signal processor (DSP) 117. A second receiver 1200 includes a plurality of differential amplifiers 123-1 to 123-*j*, an ADC unit 125, and a signal processor (DSP) 127.

The plurality of differential amplifiers 113-1 to 113-*l* and 123-1 to 123-*j* may be formed by changing connections of input ends of the plurality of amplifiers 123-1 to 123-*n*. That is, i+j≤n. Specifically, an input end connected with the ground or a DC voltage among two input ends of an amplifier 123-1 is connected to a second touch electrode 121-4, and an input end connected with the ground or the DC voltage among two input ends of an amplifier 123-1 is connected to a second touch electrode 121-5, such that two touch electrodes may be connected to one amplifier.

An input end of each of the differential amplifiers 113-1 to 113-*i* and 123-1 to 123-*j* is connected with two touch electrodes that are disposed apart from each other by at least one touch electrode. Each of the differential amplifiers 113-1 to 113-*i* and 123-1 to 123-*j* may differentially amplify two detection signals transmitted from touch electrodes and output the differentially amplified signals. Since each of the each differential amplifiers 113-1 to 113-*i* and 123-1 to 123-*j* receive detection signals from two touch electrodes and differentially amplify the received signals, the differential amplifiers 113-1 to 113-*i* and 123-1 to 123-*j* are not saturated even through a driving signal is simultaneously applied to a plurality of touch electrodes.

Each of the differential amplifiers 113-1 to 113-*i* and 123-1 to 123-*j* may receive detection signals from two touch electrodes that are separated from each other rather than two touch electrodes that are adjacent to each other. For example, each of the differential amplifiers 113-1 to 113-*i* and 123-1 to 123-*j* receives detection signals from two touch electrodes that are disposed apart from each other, while disposing one or more touch electrodes therebetween. In FIG. 10, a differential amplifier 113-1 receives touch signals from a touch electrode 111-1 and a touch electrode 111-5. When the differential amplifier 113-1 receives detection signals from two touch electrodes that are adjacent to each other (e.g., a first touch electrode 111-1 and a first touch electrode 111-2), detection signals by a touch in an area between the first touch electrode 111-1 and the first touch electrode 111-2 do not have sufficiently large values even though they are differentially amplified by the differential amplifier 113-1. Therefore, when the differential amplifier 113-1 is connected to two touch electrodes that are adjacent to each other, touch sensitivity is deteriorated. However, since the differential amplifier 113-1 receives the detection signals from the first touch electrode 111-1 and the first touch electrode 111-5, the differential amplifier 113-1 can differentially amplify so that the detection signal by the touch electrode at the position where the touch is input has a sufficiently large value, and the touch sensitivity can be improved.

Each of the ADC units 115 and 125 convert the differentially amplified detection signal to a digital signal. In addition, each of the signal processors 117 and 127 processes a plurality of differentially amplified signals converted into digital signals, and transmits the processed signal to the controller 130.

Next, referring to FIG. 11 to FIG. 13, one aspect of the display device will be described.

Figure 11:
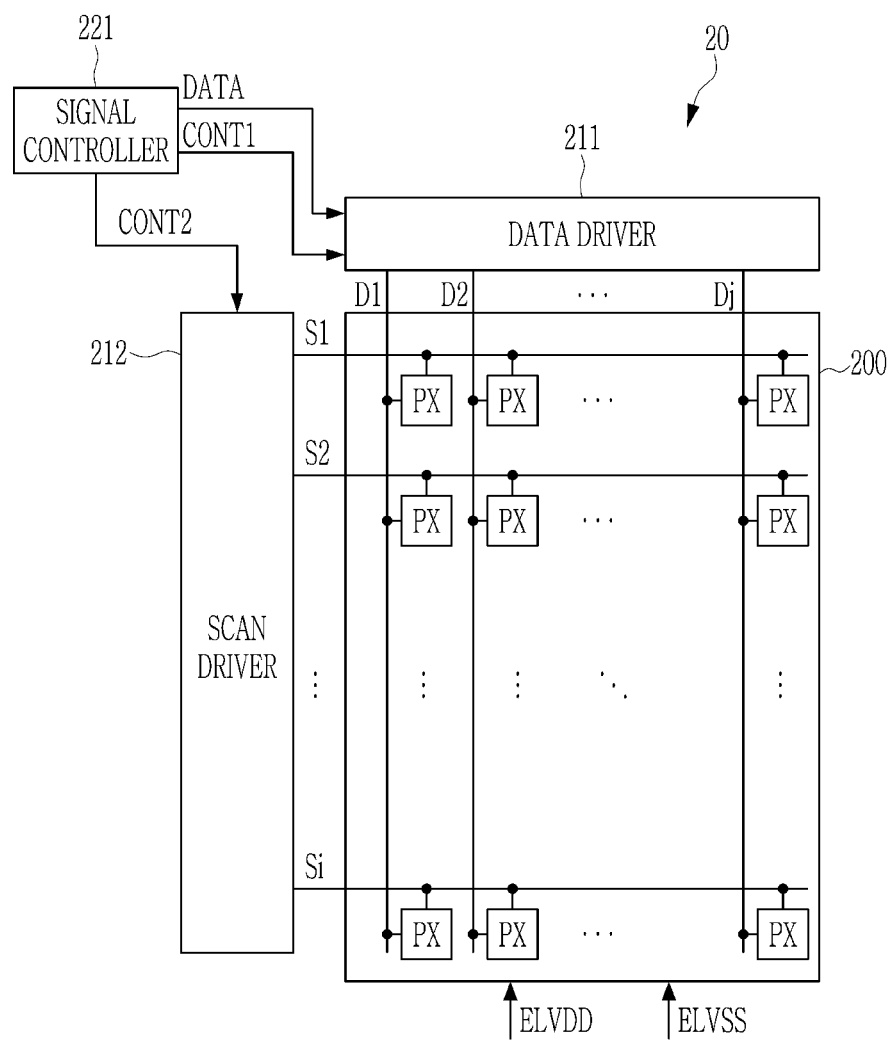
FIG. 11 schematically illustrates one aspect of the display device of FIG. 3.
Figure 12:
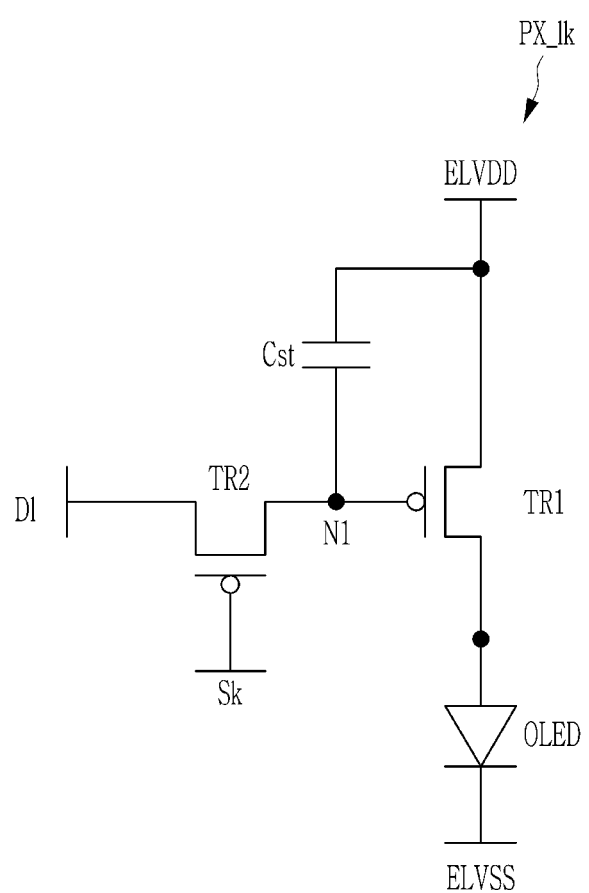
FIG. 12 shows a pixel of the display device of FIG. 11.
Figure 13:
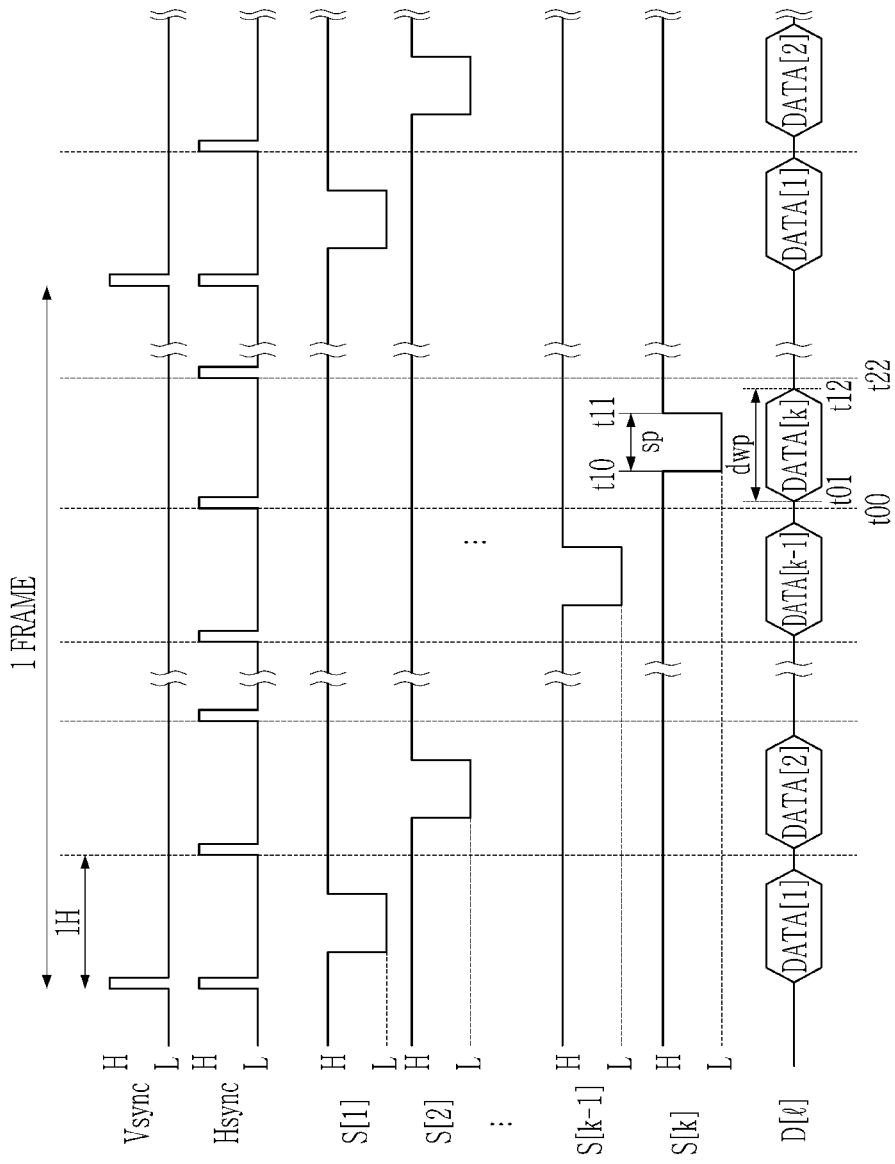
FIG. 13 is a timing diagram that shows an example of a driving signal that drives the display device of FIG. 11.

FIG. 11 schematically illustrates one aspect of the display device of FIG. 3, FIG. 12 shows a pixel of the display device of FIG. 11, and FIG. 13 is a timing diagram that shows an example of a driving signal that drives the display device of FIG. 11.

As shown in FIG. 11, a display device includes a display panel 200 including a plurality of pixels PX, a data driver 211, a scan driver 212, and a signal controller 221.

The display panel 200 includes a plurality of pixels PX arranged substantially in a matrix format. Although it is not specifically limited, a plurality of scan lines S1 to Si extend in a row direction in the alignment format of the pixels PX and they are almost parallel with each other, and a plurality of data lines D1 to Dj extend substantially in a column direction and they are almost parallel with each other.

Each of the plurality of pixels PX is connected to a corresponding signal among the plurality of scan lines S1 to Si connected to the display panel 200 and a corresponding data line among the plurality of data lines D1 to Dj connected to the display panel 200. In addition, although it is not directly illustrated in the display panel 200 of FIG. 11, each of the plurality of pixels PX is connected with a power source connected to the display panel 200 and receives a first power source voltage ELVDD and a second power source voltage ELVSS.

Each of the plurality of pixels PX emits light by a driving current supplied to an organic light emitting diode according to a corresponding data signal transmitted through a corresponding data line among the plurality of data lines D1 to Dj.

The scan driver 212 generates and transmits a scan signal corresponding to each pixel through a corresponding scan line among the plurality of scan lines S1 to Si. That is, the scan driver 212 transmits a scan signal to each of the plurality of pixels included in each pixel row through a corresponding scan line.

The scan driver 212 generates a plurality of scan signals by receiving a scan driving control signal CONT2 from the signal controller 221, and sequentially supplies scan signals to the plurality of scan lines S1 to Sj connected to each pixel row. In addition, the scan driver 212 generates a common control signal, and supplies the common control signal to common control lines connected to the plurality of pixels PX.

The data driver 211 transmits a data signal to each pixel through a corresponding data line among the plurality of data lines D1 to Dj.

The data driver 211 receives a data driving control signal CONT1 from the signal controller 221, and supplies a data signal through a corresponding data line among the plurality of data lines D1 to Dj connected to the plurality of pixels included in each pixel row.

The signal controller 221 converts an image signal transmitted from the outside into image data DATA, and transmits the image data DATA to the data driver 211. The signal controller 221 receives an external control signal such as a vertical synchronization signal Vsync, a horizontal synchronization signal Hsync, a clock signal, a data enable signal, and the like, generates control signals for controlling driving of the scan driver 212 and the data driver 211, and transmits the control signals to the scan driver 212 and the data driver 211, respectively. That is, the signal controller 221 generates and transmits a scan driving control signal CONT2 that controls the scan driver 212 and a data driving control signal CONT1 that controls the data driver 211.

As shown in FIG. 12, a pixel PX_lk may include an organic light emitting diode OLED, a first transistor TR1, a second transistor TR2, and a storage capacitor Cst. The pixel PX_lk may be located at an l-th pixel row and a k-th pixel column. Each transistor will be exemplarily described as a PMOS transistor for better understanding and ease of description.

The first transistor TR1 may be a driving transistor. In the exemplary embodiment, the first transistor TR1 may include a gate connected to a first node N1, a source connected to a first power source voltage ELVDD, and a drain connected to an anode of the organic light emitting diode OLED.

The driving current corresponds to a voltage difference between the gate and the source of the first transistor TR1, and the driving current is changed corresponding to a voltage according to a data signal applied to a data line Dl.

The second transistor TR2 may be turned on according to a level of a scan signal applied to a scan line Sk, and may connect the first node N1 and the data line Dl. In the exemplary embodiment, the second transistor TR2 may include a gate connected to the scan line Sk, a source connected to the data line Dl, and a drain connected to the first node N1. The second transistor TR2 transmits a data voltage according to a data signal D[l] transmitted through an l-th data line Dl to the first node N1 in response to a scan signal S[k] transmitted to the k-th scan line Sk.

The storage capacitor Cst is connected between the first power source voltage ELVDD and the first node N1. In the exemplary embodiment, the storage capacitor Cst may include one electrode connected to the first power source voltage ELVDD and the other electrode connected to the first node N1.

The organic light emitting diode may emit light by the driving current flowing from the first transistor TR1. In the exemplary embodiment, the organic light emitting diode OLED may include an anode connected to the drain of the first transistor TR1 and a cathode connected to the second power source voltage ELVSS.

As shown in FIG. 13, a pulse cycle of the vertical synchronization signal Vsync may be one frame period 1 FRAME of the display panel 200 according to a display frame rate.

During one frame period 1 FRAME, the data driver 211 is synchronized by the horizontal synchronization signal Hsync and thus may apply an enable-level data signal to the plurality of data lines D1 to Dj. For example, at every pulse of the horizontal synchronization signal Hsync, the data driver 211 applies a data signal corresponding to a pixel connected with a scan line to which a scan signal having a low level voltage L is applied, to all the plurality of data lines D1 to Dj.

During one frame period 1 FRAME, the scan driver 212 is synchronized with the horizontal synchronization signal Hsync, and may sequentially apply scan signals [1], S[2], ..., S[k−1], and S[k] having a low level voltage L to the plurality of scan lines S1 to Si. For example, the scan driver 212 applies a scan signal of a low level voltage L to one corresponding scan line at every pulse of the horizontal synchronization signal Hsync.

A period dwp during which a data signal is applied to a data line and a period sp during which a scan signal is a low level voltage L are included in 1 horizontal period, that is, one pulse cycle of the horizontal synchronization signal Hsync.

Related to the period dwp and the period sp, pixels connected to the scan line Sk and the data line Dl will be exemplarily described.

At t10, the 1 horizontal period 1H starts. At t01, a data signal DATA[k] is applied to the data line Dl. At t10, a scan signal S[k] applied to the scan line Sk is changed to the low level voltage L.

The time t10 at which the scan signal S[k] is changed to the low level voltage L and the time t01 at which the data signal DATA[k] starts to be applied to the data line Dl may be the same as or different from each other. For example, considering RC delay of the data line Dl, the data signal DATA[k] may be applied to the data line Dl before the scan signal S[k] is changed to the low level voltage L.

At t11, the scan signal S[k] is changed to a high level voltage H. At t12, the application of the data signal DATA[k] to the data line Dl stops. At t22, the 1 horizontal period 1H is terminated.

The time t11 at which the scan signal S[k] is changed to the high level voltage H and the time t12 at which the application of the data signal DATA[k] to the data line Dl may be the same as or different from each other. For example, the application of the data signal DATA[k] to the data line Dl may be stopped after the scan signal S[k] is changed to the high level voltage H.

A data writing period TA described with reference to FIG. 7 includes the period dwp and the period sp. Specifically, the data writing period TA may be from an earlier time among a time at which the period dwp starts and a time at which the period sp starts to a later time among a time at which the period dwp terminates and a time at which the period sp terminates, and for example, the data writing period TA may be a period from t01 to t12.

Operation of the touch panel 100 coupled to the display panel 200 of such a display device 20 will be described with reference to FIG. 14 and FIG. 15.

Figure 14:
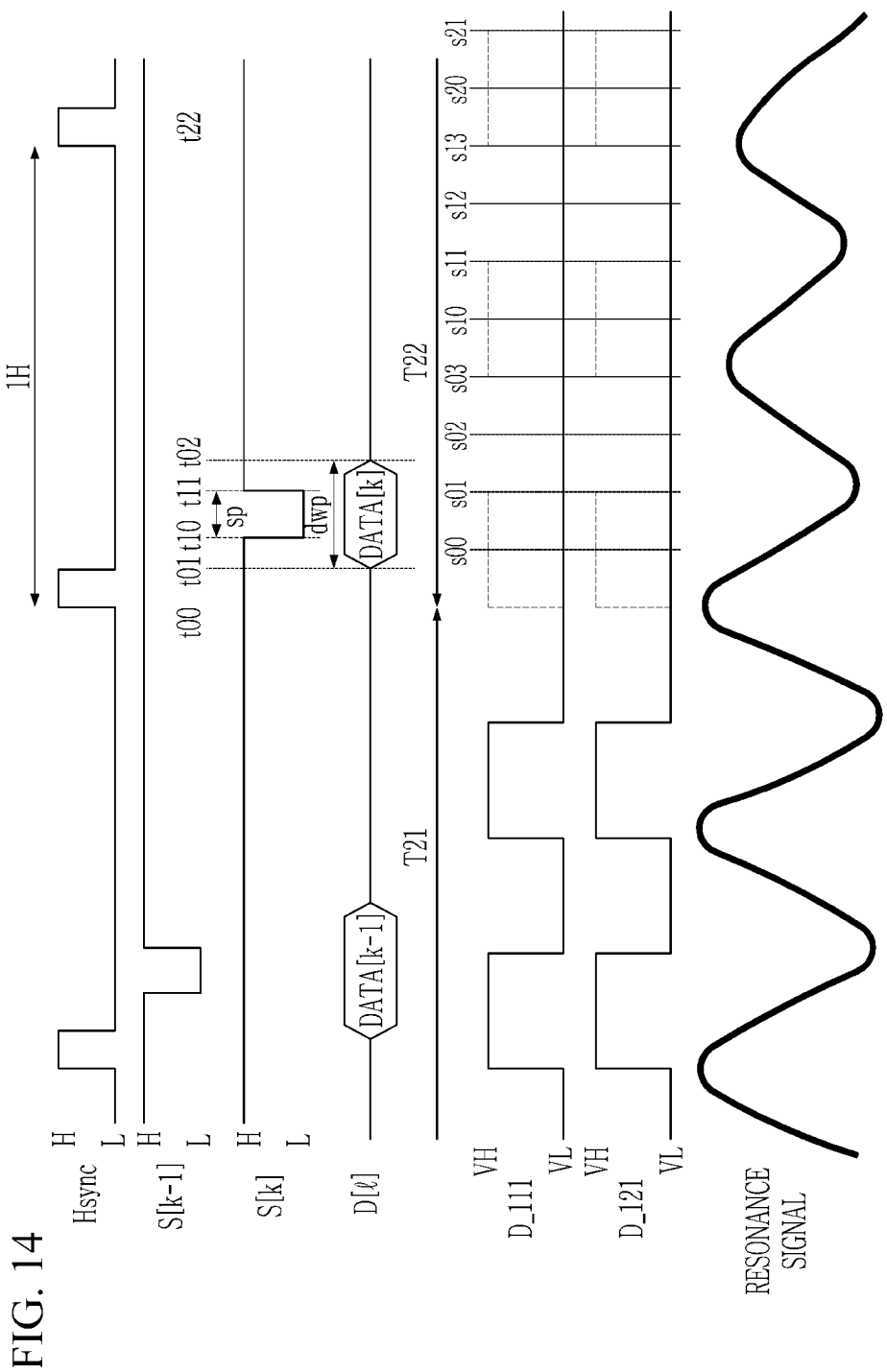
FIG. 14 and FIG. 15 are timing diagrams of a time at which a touch apparatus according to an exemplary embodiment is synchronized with the horizontal synchronization signal of the display device of FIG. 11 and thus receives a detection signal according to the driving method of FIG. 6.
Figure 15:
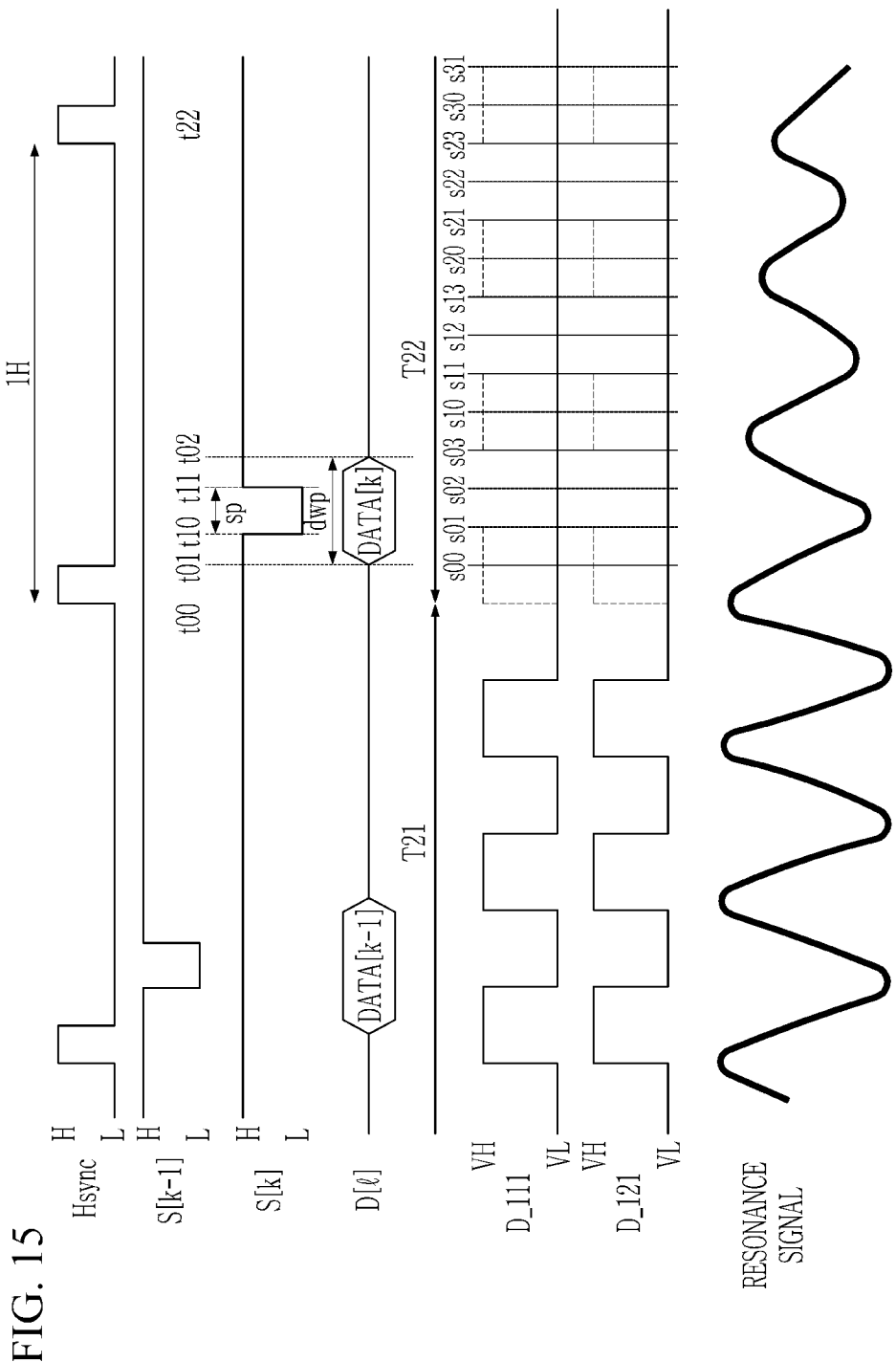

FIG. 14 and FIG. 15 are timing diagrams of a time at which a touch apparatus according to an exemplary embodiment is synchronized with the horizontal synchronization signal of the display device of FIG. 11 and thus receives a detection signal according to the driving method of FIG. 6.

As shown in FIG. 14, frequencies of driving signals D_111 and D_121 at a first sub-period T21 may be two times the frequency of the horizontal synchronization signal Hsync.

Corresponding to the frequencies of the driving signals D_111 and D_121 applied at the first sub-period T21, the first driver/receiver 110 and the second driver/receiver 120 may sample detection signals within a second sub-period T22. For example, the first driver/receiver 110 and the second driver/receiver 120 may sample detection signals at at least one of sampling times s00, s01, s02, s03, s10, s11, s12, s13, and . . . according to a clock signal having a predetermined frequency. As shown in FIG. 14, the clock signal for sampling the detection signal has a frequency that is four times the frequencies of the driving signals D_111 and D_121. At least one of the sampling times s00, s01, s02, s03, s10, s11, s12, s13, and in the present disclosure may be a random timing that may be periodically set in relation with the frequencies of the driving signals D_111 and D_121.

After the driving signal is synchronized with the pulse of the horizontal synchronization signal Hsync, a cycle of the horizontal synchronization signal Hsync may be changed due to an interface delay and the like between the signal controller 220 and the touch controller 102. In this case, a mismatch may occur between a periodically set sampling time (e.g., a clock signal for sampling a detection signal has a frequency of four times frequencies of the driving signals 111 and D_121) according to the frequencies of the driving signals D_111 and D_121 and 1 horizontal period 1H according to the horizontal synchronization signal Hsync of which the cycle is changed.

For example, when the cycle of the horizontal synchronization signal Hsync is changed after being synchronized with a first pulse of the horizontal synchronization signal Hsync, timings of sampling times in the 1 horizontal period 1H are changed because the clock signal for sampling the detection signal is synchronized with the first pulse. Then, it is difficult to distinguish whether the detection signals sampled within the 1 horizontal period 1H are detection signals sampled within the period dwp and the period sp or detection signals sampled within periods other than the period dwp and the period sp.

Thus, the driving signal may be synchronized by at least one of the pulse of the horizontal synchronization signal Hsync and a pulse of a vertical synchronization signal Vsync. That is, the timing of the driving signal may be refreshed for each horizontal frame of a predetermined period or a frame of a predetermined period.

For example, the driving signal may be synchronized to the pulses of the horizontal synchronization signal Hsync of a predetermined period. For example, after a pulse of the driving signal is initiated by being synchronized with the first pulse of the horizontal synchronization signal Hsync, the pulse of the driving signal may be initiated by being synchronized again with an i-th pulse of the horizontal synchronization signal. Accordingly, the sampling times periodically set according to the frequencies of the driving signals D_111 and D_121 may be desired times within the 1 horizontal period 1H even through the cycle of the horizontal synchronization signal Hsync is changed.

Alternatively, the driving signal may be synchronized with the pulse of the vertical synchronization signal Vsync for each frame of a predetermined period. As shown in FIG. 13, the pulse of the vertical synchronization signal Vsync may be changed to an enable level H at the same timing as the pulse of the horizontal synchronization signal Hsync of one horizontal period 1H. Therefore, it is possible to prevent distortion between the horizontal synchronization signal Hsync and the sampling time in the corresponding frame by synchronizing the pulse of the vertical synchronization signal Vsync and the driving signal for each frame. For example, a pulse of a driving signal may be initiated after being synchronized with a pulse of a vertical synchronization signal Vsync of a first frame, and then the pulse of the driving signal may be initiated by being synchronized again with a pulse of a vertical synchronization signal Vsync of a second frame. Accordingly, the predetermined sampling times may be desired times within the 1 horizontal period 1H within a frame synchronized with the vertical synchronization signal Vsync even through the cycle of the horizontal synchronization signal Hsync is periodically changed according to the frequencies of the driving signals D_111 and D_121.

In addition, in the present disclosure, at least one of sampling times s00, s01, s02, s03, s10, s11, s12, s13, and . . . may include at least two times of which phases are opposite to each other in one cycle of the frequencies of the driving signals D_111 and D_121. However, the present disclosure is not limited thereto.

In addition, in the present disclosure, at least one sampling times s00, s01, s02, s03, s10, s11, s12, s13, and . . . may include at least two times of which phases are changed within one cycle of the frequencies of the driving signals D_111 and D_121. However, the above-description is not restrictive.

The controller 130 generates touch information by using detection signals sampled in a period other than the period dwp and the period sp in the 1 horizontal period 1H. That is, the controller 130 may generate touch information that indicates touch coordinates, touch intensity, and the like by using the detection signal sampled by the first driver/receiver 110 and the second driver/receiver 120 at at least one of sampling times s10, s11, s12, s13, and . . . .

In this case, the controller 130 may acquire intensity of the detection signal, that is, amplitude, by using a difference value between a signal value sampled at the first sampling time s10 and a signal value sampled at the third sampling time s12. In addition, the controller 130 may acquire intensity of the detection signal by using a difference value between a signal value received at the second sampling time s11 and a signal value received at the fourth sampling time s13. The controller 130 may determine whether or not a touch is made, touch coordinates, and the like according to the signal intensity of the detection signal.

Alternatively, in the 1 horizontal period 1H, the controller 130 may control the first driver/receiver 110 and the second driver/receiver 120 to sample detection signals during a period other than the period dwp and the period sp.

As shown in FIG. 15, the frequencies of the driving signals D_111 and D_121 in the first sub-period T21 may be three times the frequency of the horizontal synchronization signal Hsync.

According to the exemplary embodiment, the controller 130 selects some of the detection signals sampled at least once within the second sub-period T22 based on the horizontal synchronization signal, and generates touch information using the selected detection signals. That is, the controller 130 uses detection signals sampled in a period other than the period dwp and the period sp as touch information within 1 horizontal period 1H in the second sub-section T22.

Within the 1 horizontal period 1H, the controller 130 uses detection signals sampled during a period excluding the period dwp during which a data signal is applied to the data line and the period sp during which the scan signal is the low level voltage L such that a detection signal where noise is generated according to signals applied to the data line and the scan line, which may form parasitic capacitance with touch electrodes, is not used as touch information, thereby improving the SNR.

According to another exemplary embodiment, in a period other than the period dwp and the period sp in the 1 horizontal period 1H of the second sub-period T22, the first driver/receiver 110 receives detection signals from the plurality of first touch electrodes 111-1 to 111-m and the second driver/receiver 120 receives detection signals from the plurality of second touch electrodes 121-1 to 121-n.

In the 1 horizontal period 1H, for a period excluding the period dwp during which a data signal is applied to the data line and a period sp during which the scan signal is the low level voltage L, the detection signals are sampled by the first driver/receiver 110 and the second driver/receiver 120 such that noise of the detection signals according to signals applied to the data line and the scan line, which may form parasitic capacitance with touch electrodes, can be prevented.

Next, referring to FIG. 16 and FIG. 17, other aspects of the display device will be described, and operation of a touch panel coupled to a display panel of the display device of FIG. 16 will be described with reference to FIG. 18.

Figure 16:
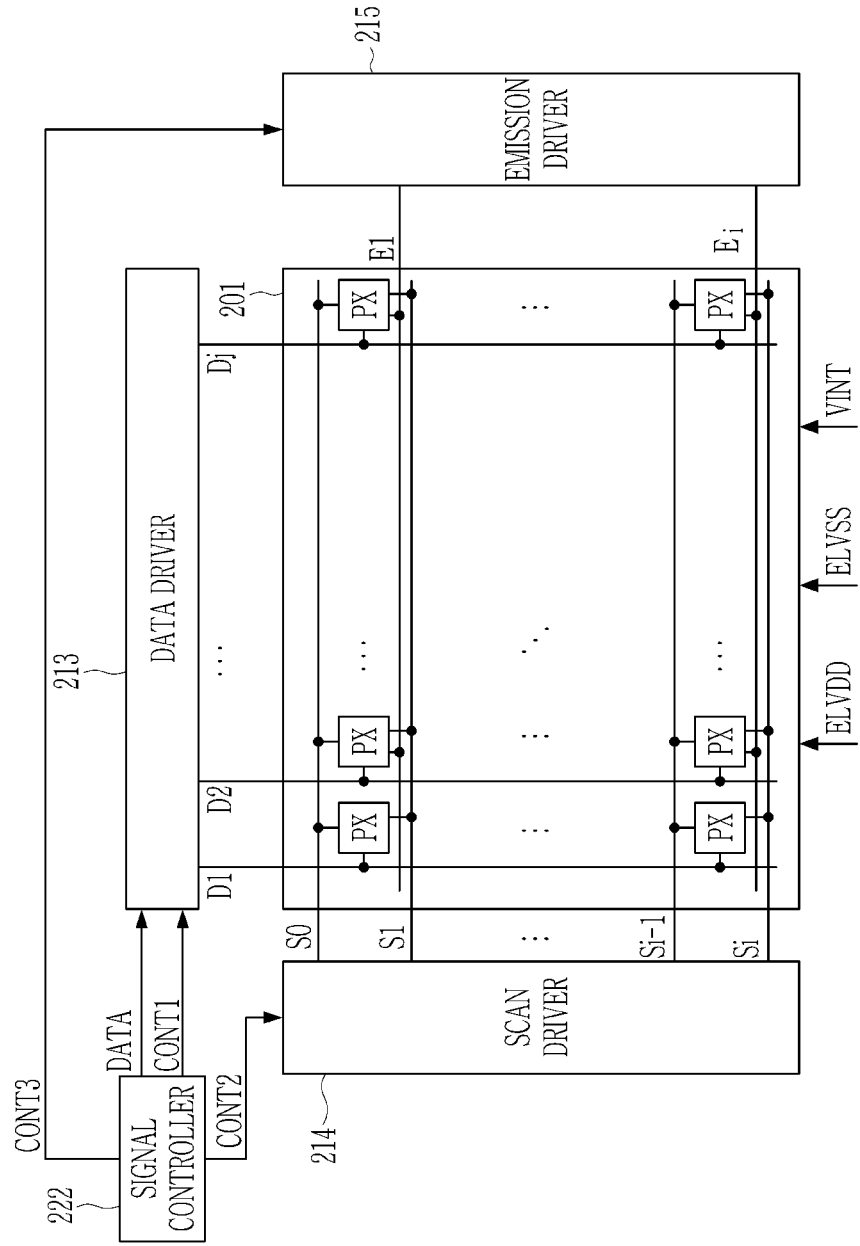
FIG. 16 is a block diagram of another aspect of the display device of FIG. 3.
Figure 17:
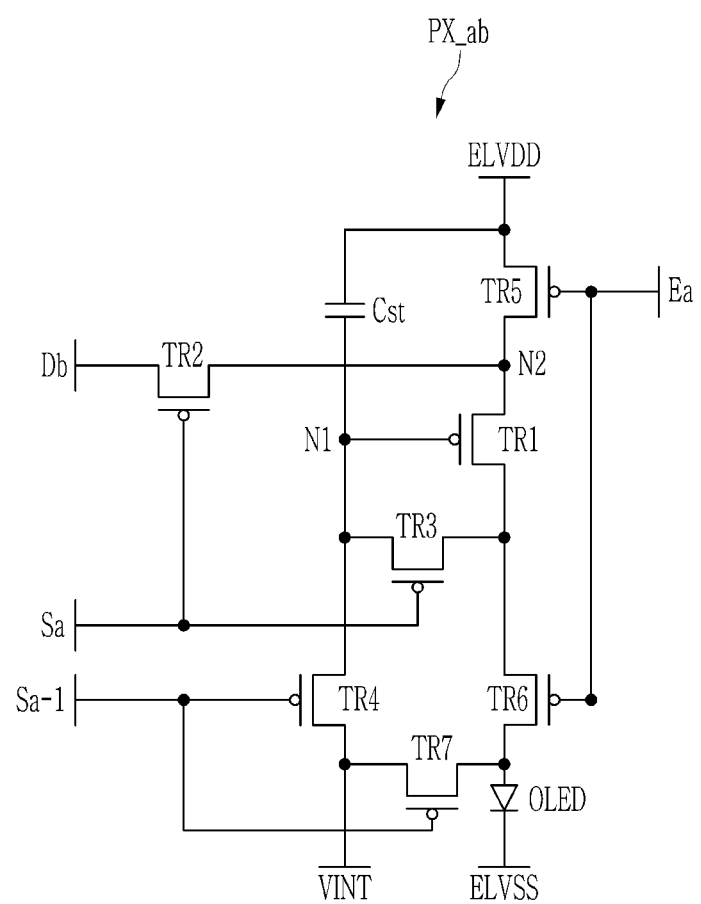
FIG. 17 shows pixels of the display device of FIG. 16.
Figure 18:
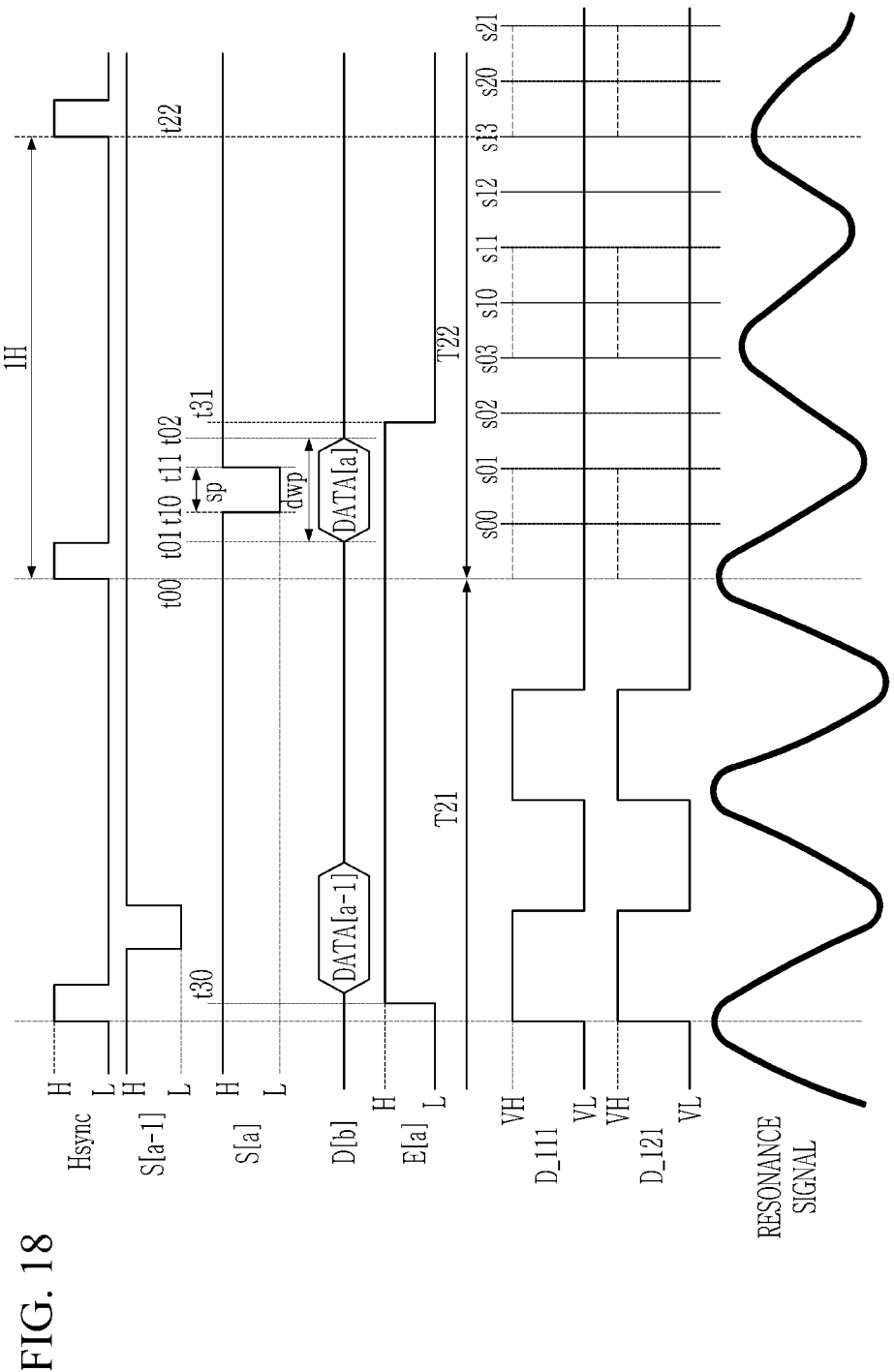
FIG. 18 is a timing diagram of a time at which a touch apparatus according to an exemplary embodiment is synchronized with the horizontal synchronization signal of the display device of FIG. 16 and thus receives a detection signal according to the driving method of FIG. 6.

FIG. 16 is a block diagram of another aspect of the display device of FIG. 3, FIG. 17 shows pixels of the display device of FIG. 16, and FIG. 18 is a timing diagram of a time at which a touch apparatus according to an exemplary embodiment is synchronized with the horizontal synchronization signal of the display device of FIG. 16 and thus receives a detection signal according to the driving method of FIG. 6.

As shown in FIG. 16, a display device includes a display panel 201 including a plurality of pixels PX, a data driver 213, a scan driver 214, a light emission driver 215, and a signal controller 222.

The display panel 201 includes a plurality of pixels PX arranged approximately in a matrix format. Although it is not particularly limited, a plurality of scan lines S0 to Si and a plurality of light emission control lines E1 to Ei extend approximately in a row direction, while opposing each other, in the alignment format of the pixels and are almost parallel with each other, and a plurality of data lines D1 to Dj extend approximately in a column direction and are almost parallel with each other.

Each of the plurality of pixels PX is connected to two corresponding scan lines among a plurality of scan lines S0 to Si connected to the display panel 201, one corresponding light emission control line among the plurality of light emission control lines E1 to Ei, and one corresponding data line among the plurality of data lines D1 to Dj. In addition, although it is not directly illustrated in the display panel 201 of FIG. 16, each of the plurality of pixels PX is connected with a power source that is connected to the display panel 201 and thus receives a first power source voltage ELVDD, a second power source voltage ELVSS, and an initialization voltage VINT.

Each of the plurality of pixels PX of the display panel 201 is connected to two corresponding scan lines. That is, each of the plurality of pixels PX is connected to a scan line corresponding to a pixel row in which the corresponding pixel is included and a scan line that corresponds to the previous pixel row of the pixel row. A plurality of pixels included in the first pixel row may be respectively connected to the first scan line S1 and a dummy scan line S0. In addition, a plurality of pixels included in an i-th pixel row are respectively connected with an i-th scan line Si that corresponds to the i-th pixel row, which is the corresponding pixel row, and an (i−1)th scan line S(i−1) that corresponds to an (i−1)th pixel row, which is the previous pixel row.

Each of the plurality of pixels PX emits light of predetermined luminance by a driving current supplied to an organic light emitting diode according to a corresponding data signal transmitted through the plurality of data lines D1 to Dj.

The scan driver 214 generates and transmits a scan signal corresponding to each pixel PX through the plurality of scan lines S0 to Si. That is, the scan driver 214 transmits a scan signal to each of a plurality of pixels included in each pixel row through corresponding scan lines.

The scan driver 214 receives a scan driving control signal CONT2 from the signal controller 222 and generates a plurality of scan signals, and sequentially supplies the plurality of scan signals to the plurality of scan lines S0 to Si connected to each pixel row.

The data driver 211 transmits a data signal to each pixel through the plurality of data lines D1 to Dj.

The data driver 211 receives a data driving control signal CONT1 from the signal controller 222, and supplies a corresponding data signal to the plurality of data lines D1 to Dj connected to each of the plurality of pixels included in each pixel row.

The light emission driver 215 is connected with a plurality of light emission control lines E1 to Ei connected to the display panel 201 that includes the plurality of pixels PX that are arranged in the matrix format. That is, the plurality of light emission control lines E1 to Ei that extend almost in parallel with each other, while opposing each of the plurality of pixels approximately in a row direction, respectively connect the plurality of pixels PX to the light emission driver 215.

The light emission driver 215 generates and transmits a light emission control signal corresponding to each pixel through the plurality of light emission control lines E1 to Ei. Each pixel to which the light emission control signal is transmitted is controlled to emit light of an image according to an image data signal in response to the control of the light emission control signal. That is, in response to the light emission control signal transmitted through the corresponding light emission control line, the operation of the light emission control transistors TR5 and TR6 (refer to FIG. 17) included in each pixel is controlled, and accordingly, the organic light emitting diode OLED connected to the light emission control transistor may or may not emit light with luminance according to a driving current corresponding to a data signal.

Each pixel PX of the display panel 201 is supplied with a first power source voltage ELVDD, a second power source voltage ELVSS, and an initialization voltage VINT. The first power source voltage ELVDD may be a predetermined high level voltage, and the second power source voltage ELVSS may be a lower voltage than the first power source voltage ELVDD or may be a ground voltage. The initialization voltage VINT may be set to a voltage value that is lower than or the same as the second power source voltage ELVSS.

Voltage values of the first power source voltage ELVDD, the second power source voltage ELVSS, and the initialization voltage VINT are not particularly limited to any values.

The signal controller 222 converts a plurality of image signals transmitted from the outside and transmits the converted image signals to the data driver 211. The signal controller 222 receives a vertical synchronization signal Vsync, a horizontal synchronization signal Hsync, and a clock signal, generates control signals for controlling driving of the scan driver 214, the light emission driver 215, and the data driver 211, and transmits the generated control signals to the scan driver 214, the light emission driver 215, and the data driver 211, respectively. That is, the signal controller 222 generates a data driving control signal CONT1 that controls the data driver 211, a scan driving control signal CONT2 that controls the scan driver 214, and a light emission driving control signal CONT3 that controls operation of the light emission driver 215, and transmits the generated signals to the drivers, respectively.

As shown in FIG. 17, a pixel PX_ab includes an organic light emitting diode OLED, a storage capacitor Cst, and first to seventh transistors TR1 to TR7. The pixel PX_ab may be located on an a-th pixel row and a b-th pixel column. Each transistor will be described as a PMOS transistor for better understanding and ease of description.

The first transistor TR1 includes a gate connected to a first node N1, a source connected to a second node N2 to which a drain of the fifth transistor T5 is connected, and a drain connected to a third node N3. A driving current flows through the first transistor TR1 according to a corresponding data signal D[b].

The driving current is a current that corresponds to a voltage difference between the source and the gate of the first transistor TR1, and is changed corresponding to a data voltage according to the applied data signal D[b].

The second transistor TR2 includes a gate connected to an a-th scan line Sa, a source connected to a b-th data line Db, and a drain connected to the second node N2 to which the source of the first transistor TR1 and the drain of the fifth transistor TR5 are commonly connected. The second transistor TR2 transmits a data voltage according to the data signal D[b] transmitted through the b-th data line Db to the second node N2 in response to a scan signal S[j] transmitted through the a-th scan line Sa.

The third transistor TR3 includes a gate connected to the a-th scan line Sa, and opposite ends respectively connected to the gate and the drain of the first transistor TR1. The third transistor TR3 operates in response to the corresponding scan signal S[j] transmitted through the a-th scan line Sa. The turned-on third transistor TR3 diode-connects the first transistor TR1 by connecting the gate and the drain of the first transistor TR1.

When the first transistor TR1 is diode-connected, a voltage that is compensated as much as a threshold voltage of the first transistor TR1 from a data voltage applied to the first transistor TR1 is applied to the gate of the first transistor TR1. Since the gate of the first transistor TR1 is connected to one electrode of the storage capacitor Cst, the voltage is maintained by the storage capacitor Cst. Since the voltage that is compensated as much as a threshold voltage of the first transistor TR1 is applied to the gate and maintained, the driving current flowing through the first transistor TR1 is not affected by the threshold voltage of the first transistor TR1.

The fourth transistor TR4 includes a gate connected to an (a−1)th scan line Sa−1, a source connected to the initialization voltage VINT, and a drain connected to the first node N1. The fourth transistor TR4 transmits the initialization voltage VINT applied through the initialization voltage VINT to the first node N1 in response to an (a−1)th scan signal S[a−1] transmitted through the (a−1)th scan line Sa−1. The fourth transistor TR4 may transmit the initialization voltage VINT to the first node N1 before application of the data signal D[b] in response to the (a−1)th scan signal S[a−1] that is transmitted in advance to the (a−1)th scan line S(a−1) that corresponds to the previous pixel row of a j-th pixel row where the corresponding pixel PX_ab is included.

In this case, although a voltage value of the initialization voltage VINT is not particularly limited, it may be set to have a low level voltage such that the gate voltage of the first transistor TR1 can be sufficiently lowered for initialization. That is, the gate of the first transistor T1 is initialized to the initialization voltage for a period during which the (a−1)th scan signal S[a−1] is transmitted to the gate of the fourth transistor TR4 with a gate-on voltage level The fifth transistor TR5 includes a gate connected to a j-th light emission control line Ej, a source connected to the first power source voltage ELVDD, and a drain connected to the second node N2.

The sixth transistor TR6 includes a gate connected to the j-th light emission control line Ej, a source connected to the third node N3, and a drain connected to an anode of the organic light emitting diode OLED.

The fifth transistor TR5 and the sixth transistor TR6 operate in response to a j-th light emission control signal E[j] transmitted through the j-th light emission control line Ej When the fifth transistor TR5 and the sixth transistor TR6 are turned on in response to the j-th light emission control signal E[j], a current path is formed in a direction toward the organic light emitting diode OLED from the first power source voltage ELVDD for flowing of the driving current. Then, the organic light emitting diode OLED emits light according to the driving current such than an image of the data signal is displayed.

The storage capacitor Cst includes one electrode connected to the first node N1 and the other electrode connected to the first power source voltage ELVDD. As previously described, since the storage capacitor Cst is connected between the gate of the first transistor TR1 and the first power source voltage ELVDD, the voltage applied to the gate of the first transistor TR1 can be maintained.

The seventh transistor TR7 includes a gate connected to an (a−1)th scan line Sa−1, a source connected to the anode of the organic light emitting diode OLED, and a drain connected to a power source of the initialization voltage VINT.

The seventh transistor TR7 may transmit the initialization voltage VINT to the anode of the organic light emitting diode in response to an (a−1)th scan signal S[a−1] that is transmitted in advance to the (a−1)th scan line Sa−1 that corresponds to the previous pixel row of the j-th pixel row where the corresponding pixel PX_ab is included. The anode of the organic light emitting diode OLED is reset to a sufficiently low voltage by the initialization voltage VINT transmitted thereto.

Driving operation of the pixel PX_ab according to the timing diagram of FIG. 18 and operation of the touch apparatus for receiving a detection signal will now be described based on the circuit diagram of the pixel PX_ab of FIG. 17.

As shown in FIG. 18, frequencies of driving signals D_111 and D_121 in the first sub-period T21 may be two times a frequency of the horizontal synchronization signal Hsync.

First, driving operation of the pixel PX_ab will be described.

The fourth transistor TR4 and the seventh transistor TR7 are turned on by a low level voltage L of the (a−1)th scan signal S[a−1] transmitted through the (a−1)th scan line Sa−1. Then, the initialization voltage VINT that initializes a voltage at the gate of the first transistor TR1 is transmitted to the first node N1 through the fourth transistor TR4.

During a period sp, the second transistor TR2 and the third transistor TR3 are turned on by the low level voltage L of the a-th scan signal S[a] transmitted through the a-th scan line Sa. Then, a data signal DATA[a] is transmitted to the first node N1 through the turned-on second transistor TR2 and the turned-on third transistor TR3.

At t31, the fifth transistor TR5 and the sixth transistor TR6 are turned on by the light emission control signal Ej of the low level voltage L. Then, a driving current by a voltage stored in the storage capacitor Cst is transmitted to the organic light emitting diode OLED such that the organic light emitting diode OLED emits light.

Next, operation for the touch apparatus to receive a detection signal will be described.

A period dwp during which a data signal is applied to a data line and a period sp during which a scan signal is a low level voltage L are included in 1 horizontal period 1H, that is, one pulse cycle of the horizontal synchronization signal Hsync. In addition, the light emission control signal is changed to the low level voltage L in the 1 horizontal period 1H.

A first driver/receiver 110 may sample a detection signal from a plurality of first touch electrodes 111-1 to 111-*m* and a second driver/receiver 120 may sample a detection signal from a plurality of second touch electrodes 121-1 to 121-*n* in at least one of sample times s00, s01, s02, s03, s10, s11, s12, s13, and . . . in the second sub-period T22.

According to the exemplary embodiment, a controller 130 selects at least a part of a detection signal that has been sampled at least once in the second sub-period T22 based on the horizontal synchronization signal, and generates touch information by using the selected part of the detection signal. That is, the controller 130 uses a detection signal sampled in a period other than the period dwp and the period sp as touch information in the 1 horizontal period 1H in the second sub-period T22.

In the 1 horizontal period 1H, detection signals sampled during a period excluding the period dwp during which a data signal is applied to a data line and the period sp during which a scan signal is the low level voltage L are used such that a detection signal where noise is generated according to signals applied to the data line and the scan line, which may form parasitic capacitance with touch electrodes, is not used as touch information, thereby improving the SNR.

According to another exemplary embodiment, in a period other than the period dwp and the period sp in the 1 horizontal period 1H of the second sub-period T22, the first driver/receiver 110 receives detection signals from the plurality of first touch electrodes 111-1 to 111-*m* and the second driver/receiver 120 receives detection signals from the plurality of second touch electrodes 121-1 to 121-*n*.

In the 1 horizontal period 1H, for a period excluding the period dwp during which a data signal is applied to the data line and the period sp during which the scan signal is the low level voltage L, the detection signals are sampled such that noise of the detection signals according to signals applied to the data line and the scan line, which may form parasitic capacitance with touch electrodes, can be prevented.

Additionally, at least one of times s10, s11, s12, and s13 is included in a period of the 1 horizontal period 1H in the second sub-period T22, excluding a time t31 at which the light emission control signal E[a] is changed to the low level voltage L.

That is, in the 1 horizontal period 1H, detection signals sampled during a period excluding the time t31 at which the light emission control signal E[a] is changed to the low level voltage L in the 1 horizontal period 1H may be used, or sample signals are sampled during a period excluding the time t31 at which the light emission control signal E[a] is changed to the low level voltage L in the 1 horizontal period 1H such that noise of detection signals according to signals applied to the light emission control line, which may form parasitic capacitance with touch electrodes, can be prevented.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A touch apparatus comprising:
  a touch sensor that is disposed in a display area of a display device that drives a plurality of pixels according to a vertical synchronization signal and a horizontal synchronization signal, and includes a plurality of first touch electrodes for sensing a touch input in a first direction and a plurality of second touch electrode for sensing a touch input in a second direction;
  a driver/receiver that applies a driving signal to at least one of the plurality of first touch electrodes and the plurality of second touch electrodes during a first section, and receives a detection signal from at least one of the plurality of first touch electrodes and the plurality of second touch electrodes during a second section after the first section; and
  a controller that generates touch information by using the detection signal,
  wherein the driving signal is synchronized with at least one synchronization signal of the horizontal synchronization signal and the vertical synchronization signal, and
  wherein the driver/receiver receives the detection signal according to frequency of the driving signal synchronized with at least one of frequency of the horizontal synchronization signal and frequency of the vertical synchronization signal.

2. The touch apparatus of claim 1, wherein the driver/receiver simultaneously applies the driving signal to at least one of the plurality of first touch electrodes and at least one of the plurality of second touch electrodes during the first section, and
  receives a detection signal from at least one of the plurality of first touch electrodes and at least one of the plurality of second touch electrodes during the second section.

3. The touch apparatus of claim 1, wherein the driving signal is synchronized with pulses of the horizontal synchronization signal of a predetermined cycle.

4. The touch apparatus of claim 1, wherein the driving signal is synchronized with a pulse of the vertical synchronization signal for each frame of a predetermined cycle.

5. The touch apparatus of claim 1, wherein a frequency of the driving signal is two or more integer times a frequency of the horizontal synchronization signal.

6. The touch apparatus of claim 1, wherein the detection signal is received at a section determined corresponding to the horizontal synchronization signal.

7. The touch apparatus of claim 6, wherein the section determined corresponding to the horizontal synchronization signal is a section other than a period during which a data signal is written into at least some of the plurality of pixels.

8. The touch apparatus of claim 7, wherein the section determined corresponding to the horizontal synchronization signal is a period during which a scan signal applied to the plurality of pixels is a disable level.

9. The touch apparatus of claim 7, wherein the section determined corresponding to the horizontal synchronization signal is a period during which a data signal is applied to at least one of a plurality of data lines connected to the plurality of pixels.

10. The touch apparatus of claim 1, wherein the driver/receiver receives the detection signal according to the frequency of the driving signal synchronized only with the frequency of the horizontal synchronization signal.

11. The touch apparatus of claim 10, wherein a receiving time of the detection signal at least comprises two times of which phases are opposite to each other within one cycle of the frequency.

12. The touch apparatus of claim 10, wherein a receiving time of the detection signal at least comprises two times of which phases are changed within one cycle of the frequency.

13. The touch apparatus of claim 1, wherein the detection signal is a signal of which a resonance signal of the driving signal is transmitted to at least one of the plurality of first touch electrodes and the plurality of second touch electrodes.

14. The touch apparatus of claim 1, wherein a thin film encapsulation layer is disposed on the plurality of pixels, the plurality of touch electrodes are disposed on the thin film encapsulation layer, and the thin film encapsulation has a thickness of 4 µm to 10 µm.

15. A driving method of a touch apparatus, comprising:
receiving a horizontal synchronization signal from a signal controller of a display device;
applying a driving signal to at least one of a plurality of first touch electrodes for sensing a touch input in a first direction and a plurality of second touch electrodes for sensing a touch input in a second direction that crosses the first direction of a touch panel during a first section;
receiving a detection signal from at least one of the plurality of first touch electrodes and the plurality of second touch electrodes during a second section after the first section according to frequency of the driving signal synchronized with at least one of frequency of the horizontal synchronization signal and frequency of a vertical synchronization signal; and
generating touch information by using the detection signal,
wherein the driving signal is synchronized with the horizontal synchronization signal.

16. The driving method of the touch apparatus of claim 15, wherein the applying of the driving signal comprises simultaneously applying the driving signal to at least one of the plurality of first touch electrodes and at least one of the plurality of second electrodes during the first section, and
the receiving of the detection signal comprises receiving a detection signal from at least one of the plurality of first touch electrodes and at least one of the plurality of second electrodes during the second section.

17. The driving method of the touch apparatus of claim 15, wherein the driving signal is synchronized with pulses of the horizontal synchronization signal.

18. The driving method of the touch apparatus of claim 15, wherein the frequency of the driving signal is two or more integer times the frequency of the horizontal synchronization signal.

19. The driving method of the touch apparatus of claim 15, wherein the detection signal is received in a section determined to correspond to the horizontal synchronization signal.

20. A display device comprising:
a display panel including a display area where a plurality of pixels are located;
a data driver that applies a data signal to data lines connected to the plurality of pixels;
a scan driver that applies a scan signal to scan lines connected to the plurality of pixels;
a signal controller that controls the data driver and the scan driver according to a horizontal synchronization signal;
a touch sensor including an active area that overlaps the display area and where a plurality of first touch electrodes for sensing a touch input in a first direction and a plurality of second touch electrodes for sensing a touch input in a second direction that crosses the first direction are located; and
a touch controller that drives the touch sensor to apply the driving signal to at least one of the plurality of first touch electrodes and at least one of the plurality of second touch electrodes during a first section, and receives a detection signal from at least one of the plurality of first touch electrodes and the plurality of second touch electrodes during a second section after the first section according to frequency of the driving signal synchronized with at least one of frequency of the horizontal synchronization signal and frequency of a vertical synchronization signal,
wherein the driving signal is synchronized with pulses of at least one synchronization signal of the horizontal synchronization signal and the vertical synchronization signal.

* * * * *